United States Patent
Charnauski et al.

(10) Patent No.: US 11,546,338 B1
(45) Date of Patent: Jan. 3, 2023

(54) DIGITAL ACCOUNT CONTROLS PORTAL AND PROTOCOLS FOR FEDERATED AND NON-FEDERATED SYSTEMS AND DEVICES

(71) Applicant: Wells Fargo Bank, N.A., San Francisco, CA (US)

(72) Inventors: Vladimir Charnauski, San Francisco, CA (US); David Mochizuki, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/141,590

(22) Filed: Jan. 5, 2021

(51) Int. Cl.
| | |
|---|---|
| *H04L 29/06* | (2006.01) |
| *H04L 9/40* | (2022.01) |
| *G06Q 20/38* | (2012.01) |
| *G06F 9/451* | (2018.01) |
| *G06F 21/62* | (2013.01) |
| *G06F 9/54* | (2006.01) |

(52) U.S. Cl.
CPC ............ *H04L 63/102* (2013.01); *G06F 9/451* (2018.02); *G06F 9/547* (2013.01); *G06F 21/629* (2013.01); *G06Q 20/382* (2013.01); *H04L 63/108* (2013.01)

(58) Field of Classification Search
CPC ..... H04L 63/102; H04L 63/108; G06F 9/451; G06F 9/547; G06F 21/629; G06Q 20/382
USPC .......................................................... 726/4
See application file for complete search history.

(56) References Cited

U.S. PATENT DOCUMENTS

| | | | |
|---|---|---|---|
| 5,485,510 | A | 1/1996 | Colbert |
| 5,573,457 | A | 11/1996 | Watts et al. |
| 5,737,423 | A | 4/1998 | Manduley |
| 5,999,978 | A | 12/1999 | Angal et al. |

(Continued)

FOREIGN PATENT DOCUMENTS

| | | |
|---|---|---|
| EP | 1 259 947 A2 | 11/2002 |
| EP | 1 770 628 A2 | 4/2007 |

(Continued)

OTHER PUBLICATIONS

Purchasing charges ahead. (1994). Electronic Buyers' News,, 68. Retrieved from https://dialog.proquest.com/professional/docview/681599288?accountid=131444 on Nov. 13, 2020 (Year: 1994).

(Continued)

*Primary Examiner* — Sanchit K Sarker
(74) *Attorney, Agent, or Firm* — Foley & Lardner LLP

(57) ABSTRACT

Systems, methods, and apparatuses for a secure digital controls portal enabling enhanced control over account functionalities and usage of secure information provided to third party systems and devices maintained by various federated and non-federated provider computing systems of various product and service providers. The secure digital controls portal can interface with various provider computing systems via custom APIs protocols. The API protocols may utilize APIs that are particular to the software and hardware operated by the various provider computing systems. The secure digital controls portal can also standardize information from the various provider computing systems. The secure digital controls portal can be a central portal accessible via a client application running on a user device that enhances one-stop switch control and security of a user's digital footprint.

19 Claims, 13 Drawing Sheets

(56) References Cited

U.S. PATENT DOCUMENTS

| | | | |
|---|---|---|---|
| 6,047,268 | A | 4/2000 | Bartoli et al. |
| 6,105,006 | A | 8/2000 | Davis et al. |
| 6,188,309 | B1 | 2/2001 | Levine |
| 6,193,152 | B1 | 2/2001 | Fernando et al. |
| 6,408,330 | B1 | 6/2002 | Delahuerga |
| 6,422,462 | B1 | 7/2002 | Cohen |
| 6,494,367 | B1 | 12/2002 | Zacharias |
| 6,575,361 | B1 | 6/2003 | Graves et al. |
| 6,717,592 | B2 | 4/2004 | Gusler et al. |
| 6,845,906 | B2 | 1/2005 | Royer et al. |
| 6,865,547 | B1 | 3/2005 | Brake et al. |
| 6,879,965 | B2 | 4/2005 | Fung et al. |
| 6,910,021 | B2 | 6/2005 | Brown et al. |
| 6,931,382 | B2 | 8/2005 | Laage et al. |
| 6,980,969 | B1 | 12/2005 | Tuchler et al. |
| 7,014,107 | B2 | 3/2006 | Singer et al. |
| 7,016,877 | B1 | 3/2006 | Steele et al. |
| 7,107,243 | B1 | 9/2006 | McDonald et al. |
| 7,219,833 | B2 | 5/2007 | Cantini et al. |
| 7,225,156 | B2 | 5/2007 | Fisher et al. |
| 7,249,099 | B2 | 7/2007 | Ling |
| 7,264,154 | B2 | 9/2007 | Harris |
| 7,319,986 | B2 | 1/2008 | Praisner et al. |
| 7,331,518 | B2 | 2/2008 | Rable |
| 7,347,361 | B2 | 3/2008 | Lovett |
| 7,359,880 | B2 | 4/2008 | Abel et al. |
| 7,383,988 | B2 | 6/2008 | Slonecker, Jr. |
| 7,392,224 | B1 | 6/2008 | Bauer et al. |
| 7,398,248 | B2 | 7/2008 | Phillips et al. |
| 7,401,731 | B1 | 7/2008 | Pletz et al. |
| 7,413,113 | B1 | 8/2008 | Zhu |
| 7,451,395 | B2 | 11/2008 | Brants et al. |
| 7,512,563 | B2 | 3/2009 | Likourezos et al. |
| 7,552,088 | B2 | 6/2009 | Malcolm |
| 7,571,142 | B1 | 8/2009 | Flitcroft et al. |
| 7,587,365 | B2 | 9/2009 | Malik et al. |
| 7,653,597 | B1 | 1/2010 | Stevanovski et al. |
| 7,685,037 | B2 | 3/2010 | Reiners et al. |
| 7,689,502 | B2 | 3/2010 | Lilly et al. |
| 7,698,221 | B2 | 4/2010 | Blinn et al. |
| 7,707,082 | B1 | 4/2010 | Lapstun et al. |
| 7,712,655 | B2 | 5/2010 | Wong |
| 7,740,170 | B2 | 6/2010 | Singh et al. |
| 7,753,265 | B2 | 7/2010 | Harris |
| 7,778,932 | B2 | 8/2010 | Yan |
| 7,818,319 | B2 | 10/2010 | Henkin et al. |
| 7,873,573 | B2 | 1/2011 | Realini |
| 7,937,325 | B2 | 5/2011 | Kumar et al. |
| 7,941,534 | B2 | 5/2011 | De La Huerga |
| 7,949,572 | B2 | 5/2011 | Perrochon et al. |
| 7,954,704 | B1 | 6/2011 | Gephart et al. |
| 8,090,346 | B2 | 1/2012 | Cai |
| 8,099,109 | B2 | 1/2012 | Altman et al. |
| 8,127,982 | B1 | 3/2012 | Casey et al. |
| 8,160,933 | B2 | 4/2012 | Nguyen et al. |
| 8,175,938 | B2 | 5/2012 | Olliphant et al. |
| 8,196,131 | B1 | 6/2012 | Von Behren et al. |
| 8,245,909 | B2 | 8/2012 | Pletz et al. |
| 8,249,983 | B2 | 8/2012 | Dilip et al. |
| 8,255,323 | B1 | 8/2012 | Casey et al. |
| 8,266,031 | B2 | 9/2012 | Norris et al. |
| 8,266,205 | B2 | 9/2012 | Hammad et al. |
| 8,280,786 | B1 | 10/2012 | Weiss et al. |
| 8,280,788 | B2 | 10/2012 | Perlman |
| 8,296,228 | B1 | 10/2012 | Kloor |
| 8,297,502 | B1 | 10/2012 | Mcghie et al. |
| 8,301,566 | B2 | 10/2012 | Mears |
| 8,332,294 | B1 | 12/2012 | Thearling |
| 8,359,531 | B2 | 1/2013 | Grandison et al. |
| 8,360,952 | B2 | 1/2013 | Wissman et al. |
| 8,364,556 | B2 | 1/2013 | Nguyen et al. |
| 8,396,808 | B2 | 3/2013 | Greenspan |
| 8,407,136 | B2 | 3/2013 | Bard et al. |
| 8,407,142 | B1 | 3/2013 | Griggs |
| 8,423,349 | B1 | 4/2013 | Huynh et al. |
| 8,473,394 | B2 | 6/2013 | Marshall |
| 8,489,761 | B2 * | 7/2013 | Pope ............... H04L 69/16 709/236 |
| 8,489,894 | B2 | 7/2013 | Comrie et al. |
| 8,543,506 | B2 | 9/2013 | Grandcolas et al. |
| 8,589,335 | B2 | 11/2013 | Smith et al. |
| 8,595,074 | B2 | 11/2013 | Sharma et al. |
| 8,595,098 | B2 | 11/2013 | Starai et al. |
| 8,625,838 | B2 | 1/2014 | Song et al. |
| 8,630,952 | B2 | 1/2014 | Menon |
| 8,635,687 | B2 | 1/2014 | Binder |
| 8,639,629 | B1 | 1/2014 | Hoffman |
| 8,655,310 | B1 | 2/2014 | Katzer et al. |
| 8,660,926 | B1 | 2/2014 | Wehunt et al. |
| 8,666,411 | B2 | 3/2014 | Tokgoz et al. |
| 8,682,753 | B2 | 3/2014 | Kulathungam |
| 8,682,802 | B1 | 3/2014 | Kannanari |
| 8,700,729 | B2 | 4/2014 | Dua |
| 8,706,625 | B2 | 4/2014 | Vicente et al. |
| 8,712,839 | B2 | 4/2014 | Steinert et al. |
| 8,725,601 | B2 | 5/2014 | Ledbetter et al. |
| 8,762,211 | B2 | 6/2014 | Killian et al. |
| 8,762,237 | B2 | 6/2014 | Monasterio et al. |
| 8,768,838 | B1 | 7/2014 | Hoffman |
| 8,781,957 | B2 | 7/2014 | Jackson et al. |
| 8,781,963 | B1 | 7/2014 | Feng et al. |
| 8,793,190 | B2 | 7/2014 | Johns et al. |
| 8,794,972 | B2 | 8/2014 | Lopucki |
| 8,851,369 | B2 | 10/2014 | Bishop et al. |
| 8,868,458 | B1 | 10/2014 | Starbuck et al. |
| 8,880,047 | B2 | 11/2014 | Konicek et al. |
| 8,887,997 | B2 | 11/2014 | Barret et al. |
| 8,924,288 | B1 | 12/2014 | Easley et al. |
| 8,954,839 | B2 | 2/2015 | Sharma et al. |
| 9,076,134 | B2 | 7/2015 | Grovit et al. |
| 9,105,021 | B2 | 8/2015 | Tobin |
| 9,195,984 | B1 | 11/2015 | Spector et al. |
| 9,256,871 | B2 | 2/2016 | Anderson et al. |
| 9,256,904 | B1 | 2/2016 | Haller et al. |
| 9,305,155 | B1 | 4/2016 | Vo et al. |
| 9,372,849 | B2 | 6/2016 | Gluck et al. |
| 9,390,417 | B2 | 7/2016 | Song et al. |
| 9,396,491 | B2 | 7/2016 | Isaacson et al. |
| 9,444,824 | B2 | 9/2016 | Balazs et al. |
| 9,489,694 | B2 | 11/2016 | Haller et al. |
| 9,514,456 | B2 | 12/2016 | England et al. |
| 9,519,934 | B2 | 12/2016 | Calman et al. |
| 9,558,478 | B2 | 1/2017 | Zhao |
| 9,569,473 | B1 | 2/2017 | Holenstein et al. |
| 9,576,318 | B2 | 2/2017 | Caldwell |
| 9,646,300 | B1 | 5/2017 | Zhou et al. |
| 9,647,855 | B2 | 5/2017 | Deibert et al. |
| 9,690,621 | B2 | 6/2017 | Kim et al. |
| 9,699,610 | B1 | 7/2017 | Chicoine et al. |
| 9,740,543 | B1 * | 8/2017 | Savage ............... G06F 9/4486 |
| 9,792,636 | B2 | 10/2017 | Milne |
| 9,792,648 | B1 | 10/2017 | Haller et al. |
| 9,849,364 | B2 | 12/2017 | Tran et al. |
| 9,853,959 | B1 | 12/2017 | Kapczynski et al. |
| 9,858,576 | B2 | 1/2018 | Song et al. |
| 9,978,046 | B2 | 5/2018 | Lefebvre et al. |
| 10,032,146 | B2 | 7/2018 | Caldwell |
| 10,044,647 | B1 | 8/2018 | Karp et al. |
| 10,050,779 | B2 | 8/2018 | Alness et al. |
| 10,115,155 | B1 | 10/2018 | Haller et al. |
| 10,152,756 | B2 | 12/2018 | Isaacson et al. |
| 10,157,420 | B2 | 12/2018 | Narayana et al. |
| 10,187,483 | B2 | 1/2019 | Golub et al. |
| 10,216,548 | B1 * | 2/2019 | Zhang ............... G06F 9/54 |
| 10,275,602 | B2 | 4/2019 | Bjorn et al. |
| 10,359,915 | B2 * | 7/2019 | Asai ............... G06F 3/147 |
| 10,402,817 | B2 | 9/2019 | Benkreira et al. |
| 10,402,818 | B2 | 9/2019 | Zarakas et al. |
| 10,417,396 | B2 | 9/2019 | Bawa et al. |
| 10,423,948 | B1 | 9/2019 | Wilson et al. |
| 10,445,152 | B1 | 10/2019 | Zhang et al. |
| 10,460,395 | B2 | 10/2019 | Grassadonia |
| 10,521,798 | B2 | 12/2019 | Song et al. |
| 10,592,882 | B1 | 3/2020 | Viswanath et al. |

(56) References Cited

U.S. PATENT DOCUMENTS

| | | |
|---|---|---|
| 10,650,448 B1 | 5/2020 | Haller et al. |
| 10,657,503 B1 | 5/2020 | Ebersole et al. |
| 10,867,298 B1 | 12/2020 | Duke et al. |
| 10,872,005 B1* | 12/2020 | Killis .................... G06F 3/0482 |
| 10,963,589 B1 | 3/2021 | Fakhraie et al. |
| 10,984,482 B1 | 4/2021 | Thangarajah et al. |
| 11,107,561 B2* | 8/2021 | Matthieu ................ G16H 50/70 |
| 2001/0001856 A1 | 5/2001 | Gould et al. |
| 2001/0032183 A1 | 10/2001 | Landry |
| 2001/0051920 A1 | 12/2001 | Joao et al. |
| 2001/0056398 A1 | 12/2001 | Scheirer |
| 2002/0016749 A1 | 2/2002 | Borecki et al. |
| 2002/0035539 A1 | 3/2002 | O'Connell |
| 2002/0038289 A1 | 3/2002 | Lawlor et al. |
| 2002/0062249 A1 | 5/2002 | Iannacci |
| 2002/0095386 A1 | 7/2002 | Maritzen et al. |
| 2002/0143655 A1 | 10/2002 | Elston et al. |
| 2002/0169720 A1 | 11/2002 | Wilson et al. |
| 2003/0046246 A1 | 3/2003 | Klumpp et al. |
| 2003/0061163 A1 | 3/2003 | Durfield |
| 2003/0097331 A1 | 5/2003 | Cohen |
| 2003/0172040 A1 | 9/2003 | Kemper et al. |
| 2003/0195847 A1 | 10/2003 | Felger |
| 2003/0200179 A1 | 10/2003 | Kwan |
| 2003/0216997 A1 | 11/2003 | Cohen |
| 2003/0217001 A1 | 11/2003 | McQuaide et al. |
| 2004/0054564 A1 | 3/2004 | Fonseca et al. |
| 2004/0054591 A1 | 3/2004 | Spaeth et al. |
| 2004/0073903 A1 | 4/2004 | Melchione et al. |
| 2004/0078325 A1 | 4/2004 | O'Connor |
| 2004/0090825 A1 | 5/2004 | Nam et al. |
| 2004/0128243 A1 | 7/2004 | Kavanagh et al. |
| 2004/0148259 A1 | 7/2004 | Reiners et al. |
| 2004/0178907 A1 | 9/2004 | Cordoba |
| 2004/0225606 A1 | 11/2004 | Nguyen et al. |
| 2004/0249710 A1 | 12/2004 | Smith et al. |
| 2004/0263901 A1 | 12/2004 | Critelli et al. |
| 2005/0010483 A1 | 1/2005 | Ling |
| 2005/0014705 A1 | 1/2005 | Cheng et al. |
| 2005/0039041 A1 | 2/2005 | Shaw et al. |
| 2005/0060233 A1 | 3/2005 | Bonalle et al. |
| 2005/0114705 A1 | 5/2005 | Reshef et al. |
| 2005/0131815 A1 | 6/2005 | Fung et al. |
| 2005/0199714 A1 | 9/2005 | Brandt et al. |
| 2005/0224587 A1 | 10/2005 | Shin et al. |
| 2005/0228750 A1 | 10/2005 | Olliphant et al. |
| 2005/0273431 A1 | 12/2005 | Abel et al. |
| 2006/0046745 A1 | 3/2006 | Davidson |
| 2006/0059110 A1 | 3/2006 | Madhok et al. |
| 2006/0178986 A1 | 8/2006 | Giordano et al. |
| 2006/0184456 A1 | 8/2006 | De Janasz |
| 2006/0190374 A1 | 8/2006 | Sher |
| 2006/0202012 A1 | 9/2006 | Grano et al. |
| 2006/0206912 A1 | 9/2006 | Klarfeld et al. |
| 2006/0235795 A1 | 10/2006 | Johnson et al. |
| 2006/0278698 A1 | 12/2006 | Lovett |
| 2007/0083463 A1 | 4/2007 | Kraft |
| 2007/0100773 A1 | 5/2007 | Wallach |
| 2007/0112673 A1 | 5/2007 | Protti |
| 2007/0123305 A1 | 5/2007 | Chen et al. |
| 2007/0143831 A1 | 6/2007 | Pearson et al. |
| 2007/0203836 A1 | 8/2007 | Dodin |
| 2007/0226086 A1 | 9/2007 | Bauman et al. |
| 2007/0255653 A1 | 11/2007 | Tumminaro et al. |
| 2007/0266257 A1 | 11/2007 | Camaisa et al. |
| 2008/0000052 A1 | 1/2008 | Hong et al. |
| 2008/0005037 A1 | 1/2008 | Hammad et al. |
| 2008/0017702 A1 | 1/2008 | Little et al. |
| 2008/0021787 A1 | 1/2008 | Mackouse |
| 2008/0029608 A1 | 2/2008 | Kellum et al. |
| 2008/0052226 A1 | 2/2008 | Agarwal et al. |
| 2008/0086398 A1 | 4/2008 | Parlotto |
| 2008/0115104 A1 | 5/2008 | Quinn |
| 2008/0149706 A1 | 6/2008 | Brown et al. |
| 2008/0154772 A1 | 6/2008 | Carlson |
| 2008/0170156 A1* | 7/2008 | Kim .................... H04N 21/4433<br>348/E5.112 |
| 2008/0191878 A1 | 8/2008 | Abraham |
| 2008/0208726 A1 | 8/2008 | Tsantes et al. |
| 2008/0229383 A1 | 9/2008 | Buss et al. |
| 2008/0244724 A1 | 10/2008 | Choe et al. |
| 2008/0260119 A1 | 10/2008 | Marathe et al. |
| 2008/0283590 A1 | 11/2008 | Oder et al. |
| 2008/0301043 A1 | 12/2008 | Unbehagen |
| 2009/0005269 A1 | 1/2009 | Martin et al. |
| 2009/0007231 A1 | 1/2009 | Kaiser et al. |
| 2009/0055269 A1 | 2/2009 | Baron |
| 2009/0055642 A1 | 2/2009 | Myers et al. |
| 2009/0112763 A1 | 4/2009 | Scipioni et al. |
| 2009/0132351 A1 | 5/2009 | Gibson |
| 2009/0205014 A1 | 8/2009 | Doman et al. |
| 2009/0228381 A1 | 9/2009 | Mik et al. |
| 2009/0287603 A1 | 11/2009 | Lamar et al. |
| 2009/0319638 A1 | 12/2009 | Faith et al. |
| 2010/0036769 A1 | 2/2010 | Winters et al. |
| 2010/0036906 A1 | 2/2010 | Song et al. |
| 2010/0063906 A1 | 3/2010 | Nelsen et al. |
| 2010/0082445 A1 | 4/2010 | Hodge et al. |
| 2010/0082487 A1 | 4/2010 | Nelsen |
| 2010/0094735 A1 | 4/2010 | Reynolds et al. |
| 2010/0100470 A1 | 4/2010 | Buchanan et al. |
| 2010/0114768 A1 | 5/2010 | Duke et al. |
| 2010/0132049 A1 | 5/2010 | Vernal et al. |
| 2010/0199098 A1 | 8/2010 | King |
| 2010/0228671 A1 | 9/2010 | Patterson |
| 2010/0274691 A1 | 10/2010 | Hammad et al. |
| 2010/0312700 A1 | 12/2010 | Coulter et al. |
| 2011/0023129 A1 | 1/2011 | Vernal et al. |
| 2011/0035318 A1 | 2/2011 | Hargrove et al. |
| 2011/0035596 A1 | 2/2011 | Attia et al. |
| 2011/0106698 A1 | 5/2011 | Isaacson et al. |
| 2011/0162057 A1 | 6/2011 | Gottumukkala et al. |
| 2011/0176010 A1 | 7/2011 | Houjou et al. |
| 2011/0178929 A1 | 7/2011 | Durkin et al. |
| 2011/0191239 A1 | 8/2011 | Blackhurst et al. |
| 2011/0196791 A1 | 8/2011 | Dominguez |
| 2011/0202462 A1 | 8/2011 | Keenan |
| 2011/0218849 A1 | 9/2011 | Rutigliano et al. |
| 2011/0247055 A1 | 10/2011 | Guo et al. |
| 2011/0276479 A1 | 11/2011 | Thomas |
| 2011/0307826 A1 | 12/2011 | Rivera et al. |
| 2011/0320246 A1 | 12/2011 | Tietzen et al. |
| 2012/0024946 A1 | 2/2012 | Tullis et al. |
| 2012/0030109 A1 | 2/2012 | Dooley Maley et al. |
| 2012/0041881 A1 | 2/2012 | Basu et al. |
| 2012/0046994 A1 | 2/2012 | Reisman |
| 2012/0047072 A1 | 2/2012 | Larkin |
| 2012/0096534 A1 | 4/2012 | Boulos et al. |
| 2012/0099780 A1 | 4/2012 | Smith et al. |
| 2012/0101938 A1 | 4/2012 | Kasower |
| 2012/0123933 A1 | 5/2012 | Abel et al. |
| 2012/0124658 A1 | 5/2012 | Brudnicki et al. |
| 2012/0158590 A1 | 6/2012 | Salonen |
| 2012/0197691 A1 | 8/2012 | Grigg et al. |
| 2012/0214577 A1 | 8/2012 | Petersen et al. |
| 2012/0227094 A1 | 9/2012 | Begen et al. |
| 2012/0239417 A1 | 9/2012 | Pourfallah et al. |
| 2012/0239670 A1 | 9/2012 | Horn et al. |
| 2012/0240235 A1 | 9/2012 | Moore |
| 2012/0254038 A1 | 10/2012 | Mullen |
| 2012/0259782 A1 | 10/2012 | Hammad |
| 2012/0265682 A1 | 10/2012 | Menon |
| 2012/0265685 A1 | 10/2012 | Brudnicki et al. |
| 2012/0270522 A1 | 10/2012 | Laudermilch et al. |
| 2012/0296725 A1 | 11/2012 | Dessert et al. |
| 2012/0296831 A1 | 11/2012 | Carrott |
| 2012/0317036 A1 | 12/2012 | Bower et al. |
| 2013/0006847 A1 | 1/2013 | Hammad et al. |
| 2013/0031006 A1 | 1/2013 | McCullagh et al. |
| 2013/0046690 A1 | 2/2013 | Calman et al. |
| 2013/0055378 A1 | 2/2013 | Chang et al. |
| 2013/0091452 A1 | 4/2013 | Sorden et al. |
| 2013/0103391 A1 | 4/2013 | Millmore et al. |
| 2013/0117696 A1 | 5/2013 | Robertson et al. |

(56) References Cited

U.S. PATENT DOCUMENTS

| | | |
|---|---|---|
| 2013/0132854 A1 | 5/2013 | Raleigh et al. |
| 2013/0151405 A1 | 6/2013 | Head et al. |
| 2013/0173402 A1 | 7/2013 | Young et al. |
| 2013/0174244 A1 | 7/2013 | Taveau et al. |
| 2013/0218649 A1 | 8/2013 | Beal |
| 2013/0218758 A1 | 8/2013 | Koenigsbrueck et al. |
| 2013/0226813 A1 | 8/2013 | Voltz |
| 2013/0240618 A1 | 9/2013 | Hall |
| 2013/0246258 A1 | 9/2013 | Dessert |
| 2013/0246272 A1 | 9/2013 | Kirsch |
| 2013/0254079 A1 | 9/2013 | Murali |
| 2013/0254115 A1 | 9/2013 | Pasa et al. |
| 2013/0339124 A1 | 12/2013 | Postrel |
| 2013/0346302 A1 | 12/2013 | Purves et al. |
| 2013/0346306 A1 | 12/2013 | Kopp |
| 2013/0346310 A1 | 12/2013 | Burger et al. |
| 2014/0006209 A1 | 1/2014 | Groarke |
| 2014/0019352 A1 | 1/2014 | Shrivastava |
| 2014/0026193 A1 | 1/2014 | Saxman et al. |
| 2014/0032419 A1 | 1/2014 | Anderson et al. |
| 2014/0032723 A1 | 1/2014 | Nema |
| 2014/0040144 A1 | 2/2014 | Plomske et al. |
| 2014/0053069 A1 | 2/2014 | Yan |
| 2014/0067503 A1 | 3/2014 | Ebarle Grecsek et al. |
| 2014/0067683 A1 | 3/2014 | Varadarajan |
| 2014/0076967 A1 | 3/2014 | Pushkin et al. |
| 2014/0108260 A1 | 4/2014 | Poole et al. |
| 2014/0108263 A1 | 4/2014 | Ortiz et al. |
| 2014/0114780 A1 | 4/2014 | Menefee et al. |
| 2014/0114855 A1 | 4/2014 | Bajaj et al. |
| 2014/0122328 A1 | 5/2014 | Grigg |
| 2014/0123312 A1 | 5/2014 | Marcotte |
| 2014/0129357 A1 | 5/2014 | Goodwin |
| 2014/0129448 A1 | 5/2014 | Aiglstorfer |
| 2014/0143886 A1 | 5/2014 | Eversoll et al. |
| 2014/0149198 A1 | 5/2014 | Kim et al. |
| 2014/0149368 A1 | 5/2014 | Lee et al. |
| 2014/0162598 A1 | 6/2014 | Villa-Real |
| 2014/0164220 A1 | 6/2014 | Desai et al. |
| 2014/0172576 A1 | 6/2014 | Spears et al. |
| 2014/0172707 A1 | 6/2014 | Kuntagod et al. |
| 2014/0180854 A1 | 6/2014 | Bryant, II |
| 2014/0198054 A1 | 7/2014 | Sharma et al. |
| 2014/0207672 A1 | 7/2014 | Kelley |
| 2014/0237236 A1 | 8/2014 | Kalinichenko et al. |
| 2014/0248852 A1 | 9/2014 | Raleigh et al. |
| 2014/0250002 A1 | 9/2014 | Isaacson et al. |
| 2014/0258104 A1 | 9/2014 | Harnisch |
| 2014/0258110 A1 | 9/2014 | Davis et al. |
| 2014/0279309 A1 | 9/2014 | Cowen et al. |
| 2014/0279474 A1 | 9/2014 | Evans et al. |
| 2014/0279559 A1 | 9/2014 | Smith et al. |
| 2014/0282852 A1 | 9/2014 | Vestevich |
| 2014/0297438 A1 | 10/2014 | Dua |
| 2014/0306833 A1 | 10/2014 | Ricci |
| 2014/0324527 A1 | 10/2014 | Kulkarni et al. |
| 2014/0337188 A1 | 11/2014 | Bennett et al. |
| 2014/0344149 A1 | 11/2014 | Campos |
| 2014/0344153 A1 | 11/2014 | Raj et al. |
| 2014/0344877 A1 | 11/2014 | Ohmata et al. |
| 2014/0357233 A1 | 12/2014 | Maximo et al. |
| 2014/0365291 A1 | 12/2014 | Shvarts |
| 2014/0372308 A1 | 12/2014 | Sheets |
| 2014/0379575 A1 | 12/2014 | Rogan |
| 2015/0019443 A1 | 1/2015 | Sheets et al. |
| 2015/0019944 A1 | 1/2015 | Kalgi |
| 2015/0026026 A1 | 1/2015 | Calman et al. |
| 2015/0026049 A1 | 1/2015 | Theurer et al. |
| 2015/0026057 A1 | 1/2015 | Calman et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0039457 A1 | 2/2015 | Jacobs et al. |
| 2015/0046338 A1 | 2/2015 | Laxminarayanan et al. |
| 2015/0046339 A1 | 2/2015 | Wong et al. |
| 2015/0066768 A1 | 3/2015 | Williamson et al. |
| 2015/0082042 A1 | 3/2015 | Hoornaert et al. |
| 2015/0088756 A1 | 3/2015 | Makhotin et al. |
| 2015/0095238 A1 | 4/2015 | Khan et al. |
| 2015/0096039 A1 | 4/2015 | Mattsson et al. |
| 2015/0100477 A1 | 4/2015 | Salama et al. |
| 2015/0100495 A1 | 4/2015 | Salama et al. |
| 2015/0106239 A1 | 4/2015 | Gaddam et al. |
| 2015/0112870 A1 | 4/2015 | Nagasundaram et al. |
| 2015/0121500 A1 | 4/2015 | Venkatanaranappa et al. |
| 2015/0127524 A1 | 5/2015 | Jacobs et al. |
| 2015/0127547 A1 | 5/2015 | Powell et al. |
| 2015/0132984 A1 | 5/2015 | Kim et al. |
| 2015/0134700 A1 | 5/2015 | Macklem et al. |
| 2015/0142673 A1 | 5/2015 | Nelsen et al. |
| 2015/0149357 A1 | 5/2015 | Ioannidis et al. |
| 2015/0154595 A1 | 6/2015 | Collinge et al. |
| 2015/0178724 A1 | 6/2015 | Ngo et al. |
| 2015/0180836 A1 | 6/2015 | Wong et al. |
| 2015/0186856 A1 | 7/2015 | Weiss et al. |
| 2015/0193764 A1 | 7/2015 | Haggerty et al. |
| 2015/0193866 A1 | 7/2015 | Van Heerden et al. |
| 2015/0199679 A1 | 7/2015 | Palanisamy et al. |
| 2015/0199689 A1 | 7/2015 | Kumnick et al. |
| 2015/0213435 A1 | 7/2015 | Douglas et al. |
| 2015/0220999 A1 | 8/2015 | Thornton et al. |
| 2015/0221149 A1 | 8/2015 | Main et al. |
| 2015/0229622 A1* | 8/2015 | Grigg .............. G06F 21/31 726/5 |
| 2015/0242853 A1 | 8/2015 | Powell |
| 2015/0248405 A1 | 9/2015 | Rudich et al. |
| 2015/0254635 A1 | 9/2015 | Bondesen et al. |
| 2015/0254646 A1 | 9/2015 | Harkey et al. |
| 2015/0254647 A1 | 9/2015 | Bondesen et al. |
| 2015/0254655 A1 | 9/2015 | Bondesen et al. |
| 2015/0269566 A1 | 9/2015 | Gaddam et al. |
| 2015/0286834 A1 | 10/2015 | Ohtani et al. |
| 2015/0287133 A1 | 10/2015 | Marlov et al. |
| 2015/0295906 A1 | 10/2015 | Ufford et al. |
| 2015/0312038 A1 | 10/2015 | Palanisamy |
| 2015/0319158 A1 | 11/2015 | Kumnick |
| 2015/0319198 A1 | 11/2015 | Gupta et al. |
| 2015/0324592 A1 | 11/2015 | Dutta |
| 2015/0339663 A1 | 11/2015 | Lopreiato et al. |
| 2015/0339664 A1 | 11/2015 | Wong et al. |
| 2015/0379508 A1 | 12/2015 | Van |
| 2016/0026997 A1 | 1/2016 | Tsui et al. |
| 2016/0028550 A1 | 1/2016 | Gaddam et al. |
| 2016/0028735 A1 | 1/2016 | Francis et al. |
| 2016/0036790 A1 | 2/2016 | Shastry et al. |
| 2016/0042381 A1 | 2/2016 | Braine et al. |
| 2016/0063497 A1 | 3/2016 | Grant, IV |
| 2016/0065370 A1 | 3/2016 | Le Saint et al. |
| 2016/0078428 A1 | 3/2016 | Moser et al. |
| 2016/0080403 A1 | 3/2016 | Cunningham et al. |
| 2016/0092696 A1 | 3/2016 | Guglani et al. |
| 2016/0092870 A1 | 3/2016 | Salama et al. |
| 2016/0092872 A1 | 3/2016 | Prakash et al. |
| 2016/0092874 A1 | 3/2016 | O'Regan et al. |
| 2016/0098577 A1 | 4/2016 | Lacey et al. |
| 2016/0098692 A1 | 4/2016 | Johnson et al. |
| 2016/0109954 A1 | 4/2016 | Harris et al. |
| 2016/0119296 A1 | 4/2016 | Laxminarayanan et al. |
| 2016/0125405 A1 | 5/2016 | Alterman et al. |
| 2016/0125409 A1 | 5/2016 | Meredith et al. |
| 2016/0140221 A1 | 5/2016 | Park et al. |
| 2016/0149875 A1 | 5/2016 | Li et al. |
| 2016/0155156 A1 | 6/2016 | Gopal et al. |
| 2016/0171483 A1 | 6/2016 | Luoma et al. |
| 2016/0173483 A1 | 6/2016 | Wong et al. |
| 2016/0180302 A1 | 6/2016 | Bagot, Jr. |
| 2016/0189121 A1 | 6/2016 | Best et al. |
| 2016/0217461 A1 | 7/2016 | Gaddam et al. |
| 2016/0232600 A1 | 8/2016 | Purves |
| 2016/0239437 A1 | 8/2016 | Le et al. |
| 2016/0239835 A1 | 8/2016 | Marsyla |
| 2016/0239840 A1 | 8/2016 | Preibisch |
| 2016/0260084 A1 | 9/2016 | Main et al. |
| 2016/0260176 A1 | 9/2016 | Bernard et al. |

(56) References Cited

U.S. PATENT DOCUMENTS

| | | |
|---|---|---|
| 2016/0267467 A1 | 9/2016 | Rutherford et al. |
| 2016/0292673 A1 | 10/2016 | Chandrasekaran |
| 2016/0294879 A1 | 10/2016 | Kirsch |
| 2016/0314458 A1 | 10/2016 | Douglas et al. |
| 2016/0321669 A1 | 11/2016 | Beck et al. |
| 2016/0328522 A1 | 11/2016 | Howley |
| 2016/0358163 A1 | 12/2016 | Kumar et al. |
| 2016/0379211 A1 | 12/2016 | Hoyos et al. |
| 2017/0004506 A1 | 1/2017 | Steinman et al. |
| 2017/0011215 A1 | 1/2017 | Poiesz et al. |
| 2017/0011389 A1 | 1/2017 | McCandless et al. |
| 2017/0024393 A1 | 1/2017 | Choksi et al. |
| 2017/0068954 A1 | 3/2017 | Hockey et al. |
| 2017/0078299 A1 | 3/2017 | Castinado et al. |
| 2017/0078303 A1 | 3/2017 | Wu |
| 2017/0091759 A1 | 3/2017 | Selfridge et al. |
| 2017/0132633 A1 | 5/2017 | Whitehouse |
| 2017/0147631 A1 | 5/2017 | Nair et al. |
| 2017/0161724 A1 | 6/2017 | Lau |
| 2017/0249478 A1 | 8/2017 | Lovin |
| 2017/0344991 A1 | 11/2017 | Mark et al. |
| 2017/0352028 A1 | 12/2017 | Vridhachalam et al. |
| 2017/0364898 A1 | 12/2017 | Ach et al. |
| 2018/0005323 A1 | 1/2018 | Grassadonia |
| 2018/0006821 A1 | 1/2018 | Kinagi |
| 2018/0025145 A1 | 1/2018 | Morgner et al. |
| 2018/0053200 A1 | 2/2018 | Cronin et al. |
| 2018/0088909 A1 | 3/2018 | Baratta et al. |
| 2018/0158137 A1 | 6/2018 | Tsantes et al. |
| 2018/0270363 A1 | 9/2018 | Guday et al. |
| 2018/0276628 A1 | 9/2018 | Radiotis et al. |
| 2018/0349922 A1 | 12/2018 | Carlson et al. |
| 2019/0007381 A1 | 1/2019 | Isaacson et al. |
| 2019/0035664 A1 | 1/2019 | Lin et al. |
| 2019/0171831 A1 | 6/2019 | Xin |
| 2019/0197501 A1 | 6/2019 | Senci et al. |
| 2019/0220834 A1 | 7/2019 | Moshal et al. |
| 2019/0228173 A1 | 7/2019 | Gupta et al. |
| 2019/0228428 A1 | 7/2019 | Bruner et al. |
| 2019/0228430 A1 | 7/2019 | Givol et al. |
| 2019/0318122 A1 | 10/2019 | Hockey et al. |
| 2019/0332802 A1 | 10/2019 | Barday et al. |
| 2019/0333061 A1 | 10/2019 | Jackson et al. |
| 2019/0347442 A1 | 11/2019 | Marlin et al. |
| 2019/0354979 A1 | 11/2019 | Crawford |
| 2019/0356641 A1 | 11/2019 | Isaacson et al. |
| 2019/0362069 A1 | 11/2019 | Park et al. |
| 2019/0369845 A1* | 12/2019 | Rucker ............... G06F 3/0486 |
| 2019/0370798 A1 | 12/2019 | Hu et al. |
| 2019/0392443 A1 | 12/2019 | Piparsaniya et al. |
| 2020/0005347 A1 | 1/2020 | Boal |
| 2020/0074552 A1 | 3/2020 | Shier et al. |
| 2020/0090179 A1 | 3/2020 | Song et al. |
| 2020/0118114 A1 | 4/2020 | Benkreira et al. |
| 2020/0118133 A1 | 4/2020 | Schmidt et al. |
| 2020/0286057 A1 | 9/2020 | Desai |
| 2021/0303335 A1* | 9/2021 | Foreman ............... G06F 9/461 |

FOREIGN PATENT DOCUMENTS

| | | |
|---|---|---|
| GB | 2 441 156 | 2/2008 |
| KR | 20160015375 | 2/2016 |
| WO | WO-90/13096 A1 | 11/1990 |
| WO | WO-00/72245 | 11/2000 |
| WO | WO-03/038551 | 5/2003 |
| WO | WO-2004/081893 | 9/2004 |
| WO | WO-2004/090825 A1 | 10/2004 |
| WO | WO-2009/151839 A1 | 12/2009 |
| WO | WO-2012/054148 | 4/2012 |
| WO | WO-2015/103443 | 7/2015 |
| WO | WO-2015/135131 A1 | 9/2015 |
| WO | WO-2018/005635 A1 | 1/2018 |

OTHER PUBLICATIONS

ASB, "How to command your cards with ASB Card Control" Apr. 20, 2015, https://www.youtube.com/watch?v=O1sfxvVUL74 (Year: 2015).

Austin Telco Federal Credit Union, "Lost or Stolen Cards", www.atfcu.org/lost-stolen-cards.htm; Apr. 9, 2004. 6 pages.

Authorize.Net. Authorize.Net Mobile Application: iOS User Guide. Sep. 2015. Authorize.Net LLC. Ver.2.0, 1-23. https://www.authorize.net/content/dam/anet-redesign/documents/iosuserguide.pdf (Year: 2015).

BancFirst, "Lost Card", https://www.bancfirst.com/contact.aspx, Oct. 28, 2003. 1 page.

CM/ECF, "CM/ECF Internet Credit Card Payment Guide", https://www.vaeb.uscourts.gov/wordpress/?page_id=340, Mar. 16, 2005. 12 pages.

CO-OP THINK, Rachna Ahlawat at CO-OP THINK—Evolution Sessions from THINK14, Dec. 22, 2014, 26:22. https://www.youtube.com/watch?v=yEp-qfZoPhl (Year: 2014).

Cronian, Darrin "Credit card companies Freeze Spending whilst Abroad", published Jun. 9, 2007, Available at: http://www.travel-rants.com/2007/06/09/credit-card-companies-freeze-spending-whilst-abroad/.

Fiserv. CardValet: Mobile Application Training. Fiserv, Inc. 1-93. https://www.westernbanks.com/media/1664/cardvalet-application.pdf (Year: 2015).

Fort Knox Federal Credit Union, "Lost or Stolen VISA Card", http://www.fortknoxfcu.org/loststolen.html, Feb. 1, 2001. 2 pages.

IP.com Search Query; May 5, 2020 (Year: 2020).

Konsko: "Credit Card Tokenization: Here's What You Need to Know", Credit Card Basics, Credit Card—Advertisement Nerdwallet (Year: 2014).

Merrick Bank, "Reporting Lost or Stolen Card Help Return to the Cardholder Center FAQs", http://www.merrickbank.com/Frequent-Asked-Questions/Report-Stolen-Card.aspx, Aug. 9, 2004. 1 page.

Microsoft, "Automatically summarize a document", 2016. 3 pages.

Notre Dame FCU "Irish Card Shield: How to Control Transaction Types" Jan. 15, 2016, 0:27, https://youtube.com/watch?v=0eZG1c6Bn38 (Year: 2016).

PCM Credit Union, "CardValet Tutorial" Jun. 24, 2015, https://www.youtube.com/watch?v=uGPh9Htw0Wc (Year: 2015).

RBC Royal Bank, "If Your Card is Lost or Stolen", http://www.rblbank.com/pdfs/CreditCard/FAQs.pdf, Oct. 1, 2002. 2 pages.

State Employees Credit Union, "Lost or Stolen Account Info", https://www.secumd.org/advice-planning/money-and-credit/privacy-fraud-protection/lost-or-stolen-account-info.aspx, May 20, 2005. 2 pages.

Union Bank & Trust, "Report Lost or Stolen Card", http://www.ubt.com/security-fraud/report-lost-or-stolen-cards, Jul. 10, 2005. 13 pages.

IEEE Xplore; 2009 First Asian Himalayas International Conference on Internet: Emergence of Payment Systems in the age of Electronic Commerce.; The state off Art. Author S Singh Nov. 1, 2009 pp. 1-18 (Year: 2009).

Demiriz et al. "Using Location Aware Business Rules for Preventing Retail Banking Frauds" Jan. 15, 2015, IEEE (Year: 2015).

Transaction aggregation as a strategy for credit card fraud detection. file:///C:/Users/eoussir/Downloads/Transaction_aggregation_as_a_strategy for credit_c. pdf (Year: 2009).

Using location aware business rules for preventing retail banking frauds. https://ieeexplore.ieee.org/stamp/stamp.jsp?tp=&arnumber=7351936 (Year: 2015).

* cited by examiner

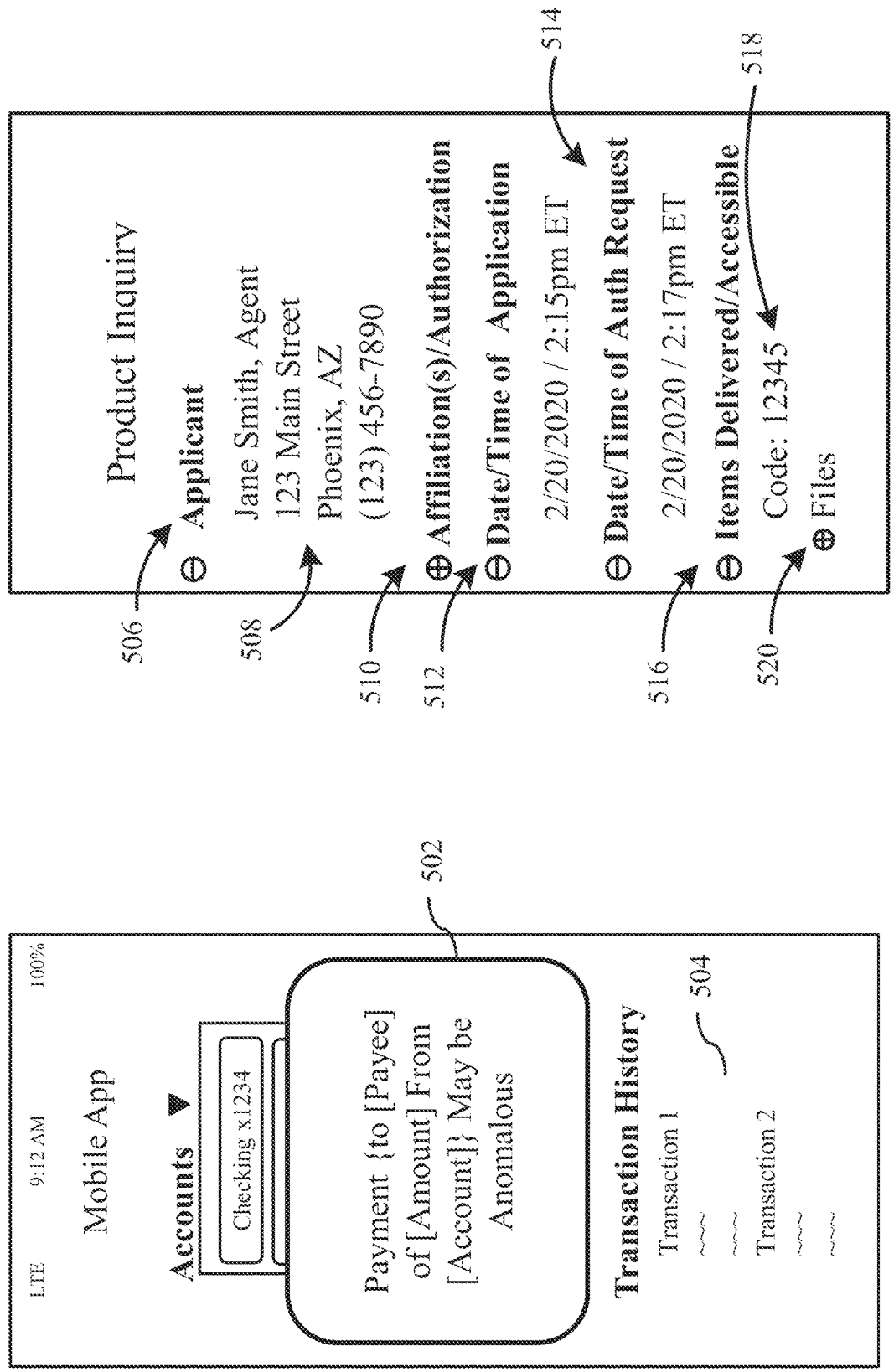

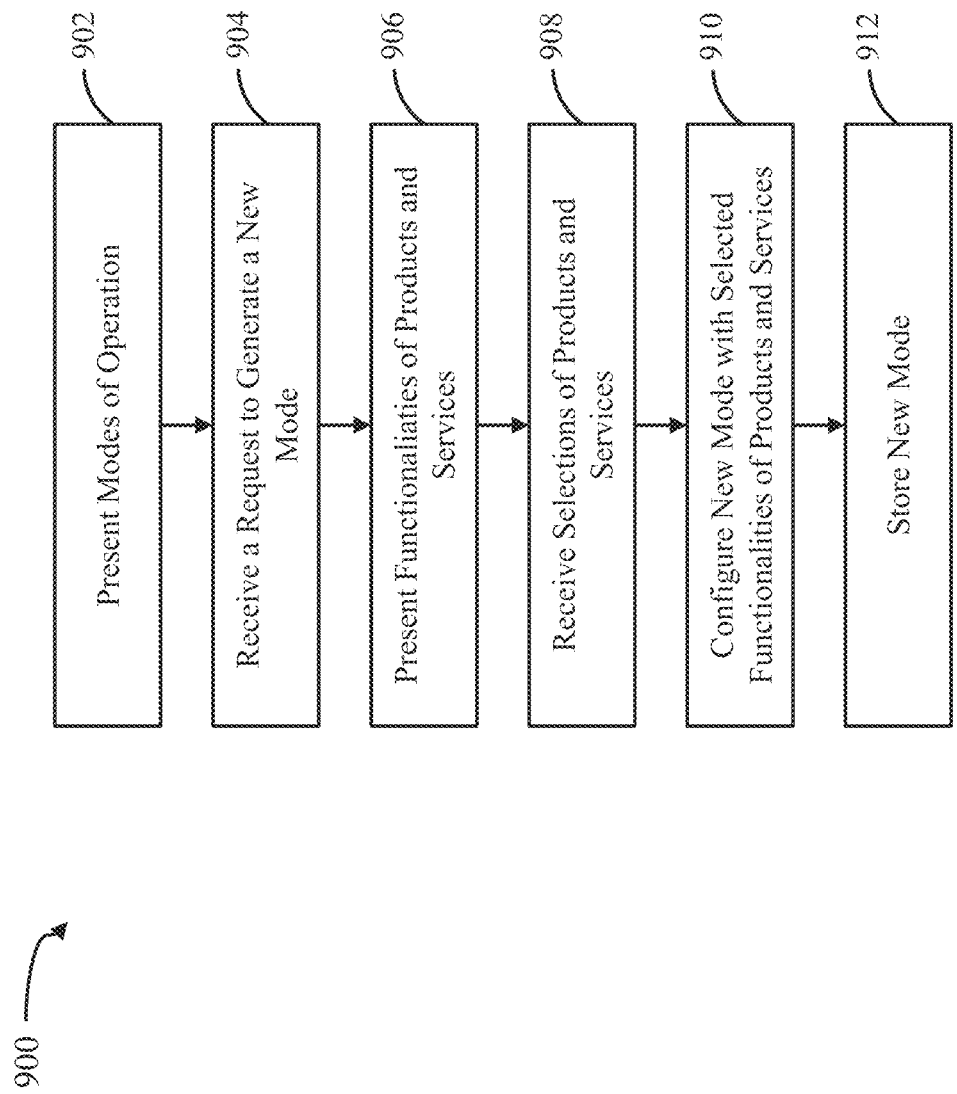

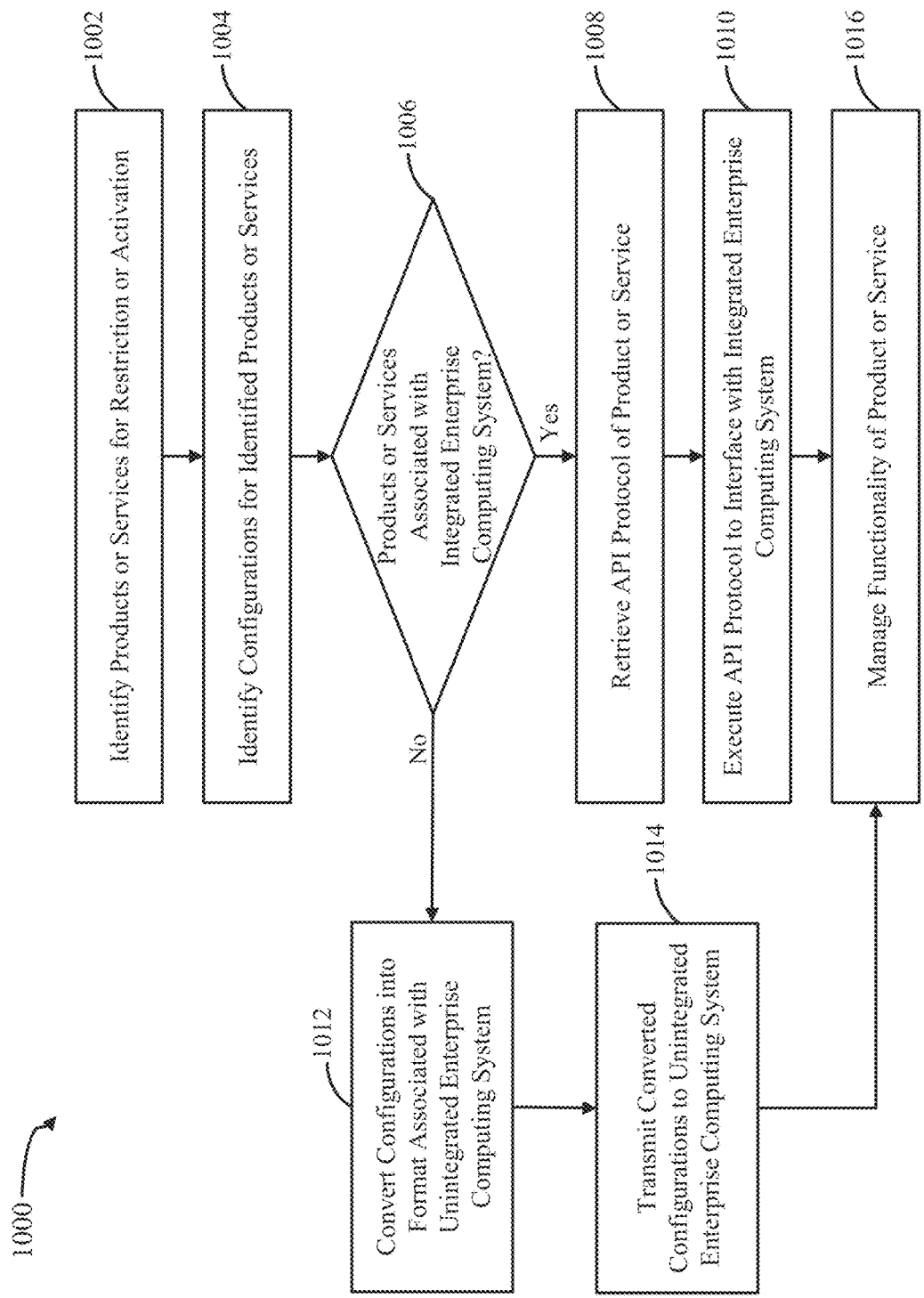

DIGITAL ACCOUNT CONTROLS PORTAL AND PROTOCOLS FOR FEDERATED AND NON-FEDERATED SYSTEMS AND DEVICES

TECHNICAL FIELD

Embodiments of the present disclosure relate to systems and methods for configuring secure access to electronic activities across a plurality of software and hardware platforms.

BACKGROUND

Banks' users currently experience risks of their identities' abuse for criminal intentions such as opening credit cards and taking loans in financial institutions (banks) without users' permission and knowledge. To facilitate these illegitimate acts, the offenders need banks to have a free access to potential victims' credit reports maintained at credit bureaus (the credit reporting agencies and FICO), as banks make their credit decisions largely based on these credit reports.

SUMMARY

Various embodiments relate to a system for providing a secure digital account controls portal. The system may include a memory having computer-executable instructions and one or more processors configured to execute instructions. The one or more processors can assign, to a first mode, a plurality of application programming interface (API) protocols in a first API set, each of the plurality of API protocols corresponding to (i) one or more unique provider computing systems that administer one or more services, and (ii) one or more functionality restrictions for each service. The one or more processors can assign, to a second mode, a subset of the plurality of API protocols in a second API set including fewer API protocols than the first API set. The one or more processors can accept a user credential via a first virtual interface. The one or more processors can grant an access to the digital controls portal in response to authenticating the user credential. The one or more processors can present, via the digital controls portal, a dashboard including a second virtual interface including a first selectable visual element that corresponds to the first mode and that is configured to indicate a first selection to activate the first mode; and a second selectable visual element that corresponds to the second mode and that is configured to indicate a second selection to activate the second mode. The one or more processors can perform at least one of: (A) executing, in response to detecting the first selection via the second visual interface of the dashboard, all API protocols in the first API set; or (B) executing, in response to detecting the second selection via the second visual interface of the dashboard, all API protocols in the second API set.

Various embodiments relate to a system for providing a secure digital controls portal. The method can be a computer-implemented method of accessing one or more services of one or more computing systems over a network using integration of one or more API protocols. The method can include assigning, to a first mode, a plurality of API protocols in a first API set, each of the plurality of API protocols corresponding to (i) one or more unique provider computing systems that administer one or more services, and (ii) one or more functionality restrictions for each service. The method can include assigning, to a second mode, a subset of the plurality of API protocols in a second API set comprising fewer API protocols than the first API set. The method can include accepting a user credential via a first virtual interface and granting access to a digital controls portal in response to authenticating the user credential. The method can include presenting, via the digital controls portal, a dashboard including a second virtual interface. The second virtual interface can include a first selectable visual element that corresponds to the first mode and that is configured to indicate a first selection to activate the first mode. The second virtual interface can include a second selectable visual element that corresponds to the second mode and that is configured to indicate a second selection to activate the second mode. The method can include executing at least one of (A) all API protocols in the first API set in response to detecting the first selection via the second visual interface of the dashboard; or (B) all API protocols in the second API set in response to detecting the second selection via the second visual interface of the dashboard.

Various embodiments relate to a non-transitory computer-readable storage medium storing one or more programs that are configured to be executed by one or more processors of a computer system. The one or more programs can include instructions for assigning, to a first mode, a plurality of API protocols in a first API set, each of the plurality of API protocols corresponding to (i) one or more unique provider computing systems administering one or more services, and (ii) one or more functionality restrictions for each service. The one or more programs can include instructions for assigning, to a second mode, a subset of the plurality of API protocols in a second API set comprising fewer API protocols than the first API set. The one or more programs can include instructions for accepting a user credential via a first virtual interface and granting access to a digital controls portal in response to authenticating the user credential. The one or more programs can include instructions for presenting, via the digital controls portal, a dashboard including a second virtual interface. The second virtual interface can include a first selectable visual element that corresponds to the first mode and that is configured to indicate a first selection to activate the first mode. The second virtual interface can include a second selectable visual element that corresponds to the second mode and that is configured to indicate a second selection to activate the second mode. The one or more programs can include instructions for executing at least one of (A) all API protocols in the first API set in response to detecting the first selection via the second visual interface of the dashboard; or (B) all API protocols in the second API set in response to detecting the second selection via the second visual interface of the dashboard.

BRIEF DESCRIPTION OF THE FIGURES

FIGS. 5A and 5B provide example views of electronic activities in a non-standardized format from non-federated provider computing systems, according to various potential embodiments.

FIG. 9 is a flow diagram of an example method for creating a new mode for managing functionalities of products or services maintained by provider computing systems, according to various potential embodiment.

FIG. 10 is a flow diagram of an example method for managing functionalities of products or services maintained by integrated and unintegrated provider computing systems, according to various potential embodiments.

DETAILED DESCRIPTION

Referring to the figures generally, systems, methods, and apparatuses for a secure digital account controls portal enabling enhanced control over account functionalities and usage of secure information provided to third party systems and devices maintained by various federated and non-federated provider computing systems of various product and service providers. The secure digital controls portal can interface with various provider computing systems via custom APIs protocols. The API protocols may utilize APIs that are particular to the software and hardware operated by the various provider computing systems. The secure digital controls portal can also convert the information from the various provider computing systems to a standardized format depending on the software and hardware operated by the various providers. The secure digital controls portal can be a central portal where a user of any institutional computing system can manage access to and use of account information and personal information stored at any kind of provider computing systems of, for example, e-commerce platforms, financial institutions, smart devices, or social media platforms. The secure digital account controls portal may also be used in both private and business settings to serve customers and employees alike, such as by allowing a user to manage products and services maintained for both their personal and business uses. By managing access to and use of account information, the secure digital controls portal can allow a user implement data privacy controls over how much information of the user is accessible, available, or maintained by third party computing systems. Accordingly, the user does not need to log separately into each individual third-party system or user device to manage, secure, or restrict user information, and the secure digital controls portal can be a one-stop switch that control users' entire digital footprint, protect their reputation, and minimize users' digital identity or account takeover, fraud, or misuse.

Figure 1:
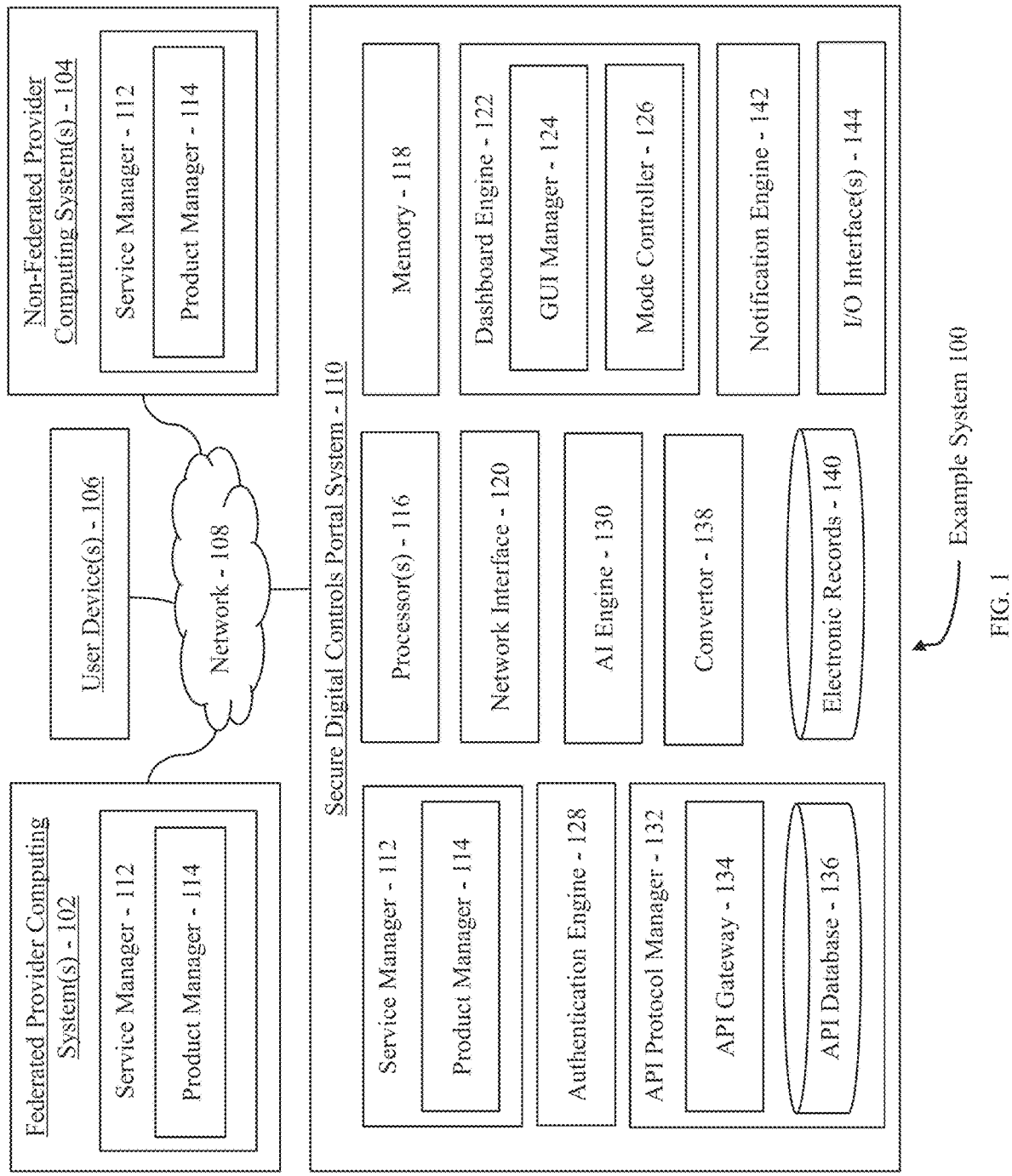
FIG. 1 is a block diagram of an example system enabling a secure digital controls portal, according to various potential example embodiments.

Referring to FIG. 1, a block diagram of an example system 100 is shown according to various potential example embodiments. System 100 may include one or more federated provider computing systems 102 (which may include one or more computing devices of a provider in one or more locations), one or more non-federated provider computing systems 104 (which may include one or more computing devices of a provider in one or more locations), and one or more user devices 106 (which may include multiple computing devices of one or more users in one or more locations) in communication, via a network 108, with a secure digital controls portal system 110 (generally referred to as system 110).

The federated provider computing systems 102 may be integrated and configured to communicate, via the network 108, with the system 110. The federated provider computing systems 102 can be computing or network systems that are configured to securely interface with the system 110. The federated provider computing systems 102 and the system 110 can be two distinct, formally disconnected, geographically separate computing clouds or telecommunications networks that may have different internal structures but are able to engage in inter-operational functionalities through, for example, custom API protocols. In contrast, the non-federated provider computing systems 104 may not be configured to interface with the system 110 via established API protocols. The federated provider computing systems 102 and/or the non-federated provider computing systems 104 may be the computing systems of financial institutions that provide financial services (e.g., demand deposit accounts, credit accounts, etc.) to a plurality of users. The financial institution computing systems may provide banking services to the users by, for example, allowing users to deposit funds into accounts, withdraw funds from accounts, transfer funds between accounts, view account balances, and the like via the federated provider computing systems 102 or the non-federated provider computing systems 104.

Additionally, the federated provider computing systems 102 and/or the non-federated provider computing systems 104 may be the computing systems of non-financial institutions. For example, federated provider computing systems 102 of non-financial institutions may be associated with social media account platforms (e.g., "Facebook"), email accounts and services providers (e.g., "Gmail", "Yahoo Mail", and "Outlook"), delivery services (e.g., U.S. Postal Service (USPS), "FedEx" and "UPS"), government institutions (e.g., IRS and SSA), online retailers (e.g., "Amazon"), advertisers, or other non-financial service providers. Furthermore, the federated provider computing systems 102 or the non-federated provider computing systems 104 can be computing devices such as smart devices or internet of things (IoT) devices such as smart lightbulbs and home appliances, Wi-Fi routers, leak detectors, security systems, smart locks, or internet connected and/or programmable thermostats (or systems that control one or more of such devices, such as hubs, portals, etc.).

The federated provider computing systems 102 or the non-federated provider computing systems 104 may include an API gateway and/or any other networking or interfacing software or hardware to receive API calls (used interchangeably with API requests) and information from the system 110. For instance, the provider computing systems can transmit information associated with products or services to the system 110 or receive configuration requests from the secure additional system 110 to manage functionalities, provisioning, delivery, and/or access of products and/or services. The federated provider computing systems 102, the non-federated provider computing systems 104, and the system 110 may also include a service manager 112 and a product manager 114.

The service manager 112 may provide access to services relating to, for example, payments, banking, financial institutions, digital safe boxes, credit bureaus, credit agencies, research services, social media, e-commerce, retailers, travel and leisure, government services, refinancing, balance transfer, car loans, business communications, journalism, personal communications, and/or internet of things monitoring services such as car needs, oil changes, lights switches, refrigerator schedules, and power usage.

The product manager 114 may provide access to products relating to, for example, personal identity, "PayPal" or "Zelle" payment capabilities, Facebook, Gmail, Yahoo Mail, Outlook, "USPS", "FedEx", "UPS", "Equifax", education records, property records, wills, estates, taxes, medical records, passports, driver's license, voting card, government accounts, library card, medical records, medication, ancestry records, games, avatars, virtual identity, and internet of things products such as cars, smart lights, refrigerators, and power devices.

The user devices 106 may include one or more mobile and non-mobile devices such as smartphones, tablet computing devices, wearable computing devices (e.g., a smartwatch, smart optical wear, etc.), personal computing devices such as laptops, voice-activated digital assistance devices (e.g., smart speakers having chat bot capabilities), portable media devices, vehicle infotainment systems, etc., that may access one or more software applications running locally or remotely. In some examples, a user device 106 may access the system 110 through various one or more user devices 106 at the same time or at different times. For example, the user may access the system 110 via a digital assistance device 106 while also accessing the system 110 using a wearable computing device 106 (e.g., a smart watch). In other examples, the user may access the system 110 via a digital assistance device 106 and later access the system 110 via a vehicle infotainment system 106.

As indicated, the one or more computing devices 106 may communicate with the system 110 through the network 108. Each user device 106 may interact with the system 110 using one or more devices. In some arrangements, the network 108 includes the internet, cellular networks, personal area networks, peer-to-peer networks, Wi-Fi networks, etc. The user devices 106 may include one or more specialized devices configured for use in engaging generally with the system 110, and/or engaging specifically in dashboards administered by the system 110. Alternatively, or additionally, the user device 106 may include one or more multipurpose computing devices capable of executing a downloadable application associated with the provider to facilitate the provision of the authentication circle. In some arrangements, the application is executed locally on the user devices 106 (e.g., a smartphone, tablet computing device, etc., running one or more applications). In other arrangements, the user device 106 may be a virtual assistance device (which may implement, e.g., "Google Assistant," "Amazon Alexa," etc.) communicatively coupled to the system 110 directly or via a third-party computing system (e.g., servers of Google, Amazon, etc.). Users may use, via the user device 106, the application to access various services provided by the system 110. In some embodiments, users may use the application to access, via the system 110, services associated with the service manager 112 and products associated with the product manager 114. The application may also be used to provide users with the integrated view/dashboard of the system 110.

The system 110 may be the computing system of a financial institution that provides financial services (e.g., demand deposit accounts, credit accounts, etc.) to a plurality of customers, and may thus be a financial institution computing system. The financial institution computing system may provide banking services to user devices by, for example, allowing users to use a client application running on the user devices 106 to, for example, deposit funds into accounts, withdraw funds from accounts, transfer funds between accounts, view account balances, and the like via the system 110. In other embodiments, the system 110 is not a financial institution computing system.

The system 110 may be a backend computer system that interacts with the user devices 106 and supports other services offered by the service provider, such as financial management and investment services. Accordingly, the system 110 may include one or more service managers 112, one or more product managers 114, one or more processors 116, memory 118, a network interface 120, a dashboard engine 122 including a GUI manager 124 and a mode controller 126, an authentication engine 128, an artificial intelligence (AI) engine 130, an API protocol manager 132, an API gateway 134, an API database 136, a convertor 138, one or more electronic records 140, a notification engine 142, and I/O interface 144.

The one or more processors 116 may be implemented as a general-purpose processor, an ASIC, one or more FPGAs, a DSP, a group of processing components, or other suitable electronic processing components structured to control the operation of the user device 106.

The memory 118 (e.g., RAM, ROM, NVRAM, Flash Memory, hard disk storage) may store data and/or computer code for facilitating at least some of the various processes described herein, as well as one or more data repositories (which may include, e.g., database records such as user data, electronic activities, and acquired information). In this regard, the memory 118 may store programming logic that, when executed by the processor 116, control the operation of the system 110. For instance, the memory 118 can have computer-executable instructions that the one or more processors 116 are configured to execute.

The network interface 120 may facilitate communications between the system 110 and the network 108 over any of a variety of network protocols such as Ethernet, Bluetooth, or Wi-Fi.

The system 110 is structured to facilitate the provisioning of the dashboard engine 122 to manage a services or products directly or via a network (e.g., the network 108). The dashboard may include the GUI manager 124 and the mode controller 126. The dashboard engine 122 can provide, through the GUI manager 124, access to the one or more users over a network to manage electronic activities associated with their products and services. The dashboard engine 122 can also allow a user device to see and control what information they can share with third parties. By controlling which information is shared with which party, the dashboard engine 122 can allow a user to protect their privacy relating to their financial information, medical information, or any other part of their digital footprint. For instance, the dashboard engine 122 can have a mode corresponding to turning off online payments facilitated via the service manager 112 or the product manager 114. Similarly, the modes can allow a user to select which functionalities of the products or services are active or which of them have access to information of the user. In particular, the modes can correspond to various functions such as a credit freeze (or a credit report freeze or a security freeze) that prevents anyone's computing devices from accessing a user's credit report and therefore prevents anyone from considering the user for a potential new loan or a new account. For instance, a credit freeze mode can lock a user's account information stored within computing systems of credit bureaus from external access. The modes can also correspond with a credit lock (a credit report lock down or a credit lock down). The credit lock can restrict access to a user's information for a limited amount of time. When necessary to allow an access one or more federated provider computing systems 102 or one or more non-federated provider computing systems 104, a user can unlock the credit report immediately on-line at any time.

The dashboard engine 122 can also instruct or otherwise cause the notification engine 142 to transmit activity alerts. For instance, fraud alerts, unlike with a credit freeze and credit lock, can transmit notifications (e.g., push notifications, SMS or other text messages, email messages, etc.) to user devices upon detection of suspicious activity without restricting accessibility of the user's credit to provider computing systems of financial institutions or otherwise. Suspicious activity may be detected by, for example, the federated provider computing system 102 and/or the non-federated provider computing system 104. Suspicious activities can include, for example, failed authentication attempts (e.g., above a threshold number of failed attempts), electronic activities unusual for the particular user, such as unusual for being at unusual times for a user (such as night hours or other times that may fall within a certain percentile of account access times, such as 95th or 99th percentile indicating that fewer than 5% or 1% of access attempts have historically occurred at a certain time range), payment activities at locations not associated with the user, and/or other metrics. If the user indicates via the user device 106 (e.g., via a client application running on the user device), in response to a notification received at the user device, that the user is engaging in the activity, or that the activity is otherwise authorized, the accounts may remain accessible to provider computing systems.

The GUI manager 124 can present various interfaces for a user to interact, operate, or manage the dashboard engine 122. In some embodiments, the GUI manager 124 can present the interfaces to a client application running on a user device 106 (e.g., a dashboard with a graphical user interface) for set up or activation of a fraud alert with various provider computing systems. For instance, the GUI manager 124 can enable the user to input selections for setting up fraud alerts and the user device 106 may transmit instructions to the requested alerts to one or more provider computing systems of one or more credit bureaus, which may transmit notifications to other provider computing systems of other credit bureaus about the request and transmit a notification (e.g., via an API protocol) to the user device 106 whenever there is suspicious activity. In some embodiments, the GUI manager 124 can present information about products and services, but not accept selections to restrict, activate, or modify functionalities of the monitored product or service. For instance, the GUI manager 124 can receive selections for credit monitoring, such as of a credit score, but a credit score cannot be modified, so the GUI manager 124 won't accept a selection to modify the credit score. However, the GUI manager 124 can leverage the extensive connectivity of the system 110 to present a selection to restrict products or services related to a credit score, such as product inquiries, credit cards, or mortgages. The GUI manager 124 can present any significant changes in user's credit score that may be indicative of fraud or identity theft. Accordingly, the GUI manager 124 provides a variety of different tools and interfaces to monitor, restrict, modify, or activate various services and products. For instance, users can quickly manage all the digital information without resorting to time-consuming methods such as manual logins, setting adjustments, or password changes. As such, the GUI manager 124 presents a one-stop shop for users to access and manage their entire portfolio of electronic activities corresponding to their digital footprint.

The mode controller 126 can manage, control, or store modes to operate the service manager 112 and the product manager 114 according to a mode of operation. The modes can be a one-click operation to restrict, activate, or modify services or products associated with the system 110. The mode controller 126 can include pre-set modes (or user-defined custom modes) that can correspond to restriction of API protocols. Each mode can correspond to a set of one or more API protocols, with each API protocol corresponding to a set of API-related operations. For example, a mode may be defined by a pair of API protocols, with each API protocol corresponding to one or more APIs to be executed in combination with one or more API requests (e.g., API calls). The first API protocol may comprise, for example, a first API request using a first API to a first provider computing system. The first API request includes codes (e.g., tokenized credentials) or other data authenticating the sender system and identifying one or more functionalities to be performed (e.g., one or more account operations to be restricted for a first account) by the first system receiving the first API request. The second API request uses a second provider computing system. The second API call includes codes or other data authenticating the sender system and identifying one or more functionalities to be performed (e.g., one or more account operations to be restricted for a second account) by the second system receiving the second API request. Each functionality can correspond to a configuration set up by the user device 106 or the AI engine 130 to manage functionalities of accounts, provisioning of products or services, control over devices (e.g., smart home and/or IoT devices) etc. For instance, functionalities of the product or service can be location gathering, targeted advertising, or data inquiries.

In some embodiments, the API mode controller 126 can configure functionalities of products or services managed by the system 110, such as by the service manager 112 or the product manager 114 operating within the system 110. The user can further generate, refine, or modify the modes. For instance, the user can generate a mode relating to end-of-life scenarios such as releasing a will or restricting monthly subscriptions, or, for military personnel, a mode for military deployments overseas. The modes can be activated responsive to the selectable visual elements associated with the GUI manager 124. For instance, a first mode can correspond to executing all API protocols in the first API set. In some embodiments, the first mode is configured to restrict electronic activities associated with the first API set.

Figures 3A, 3B:
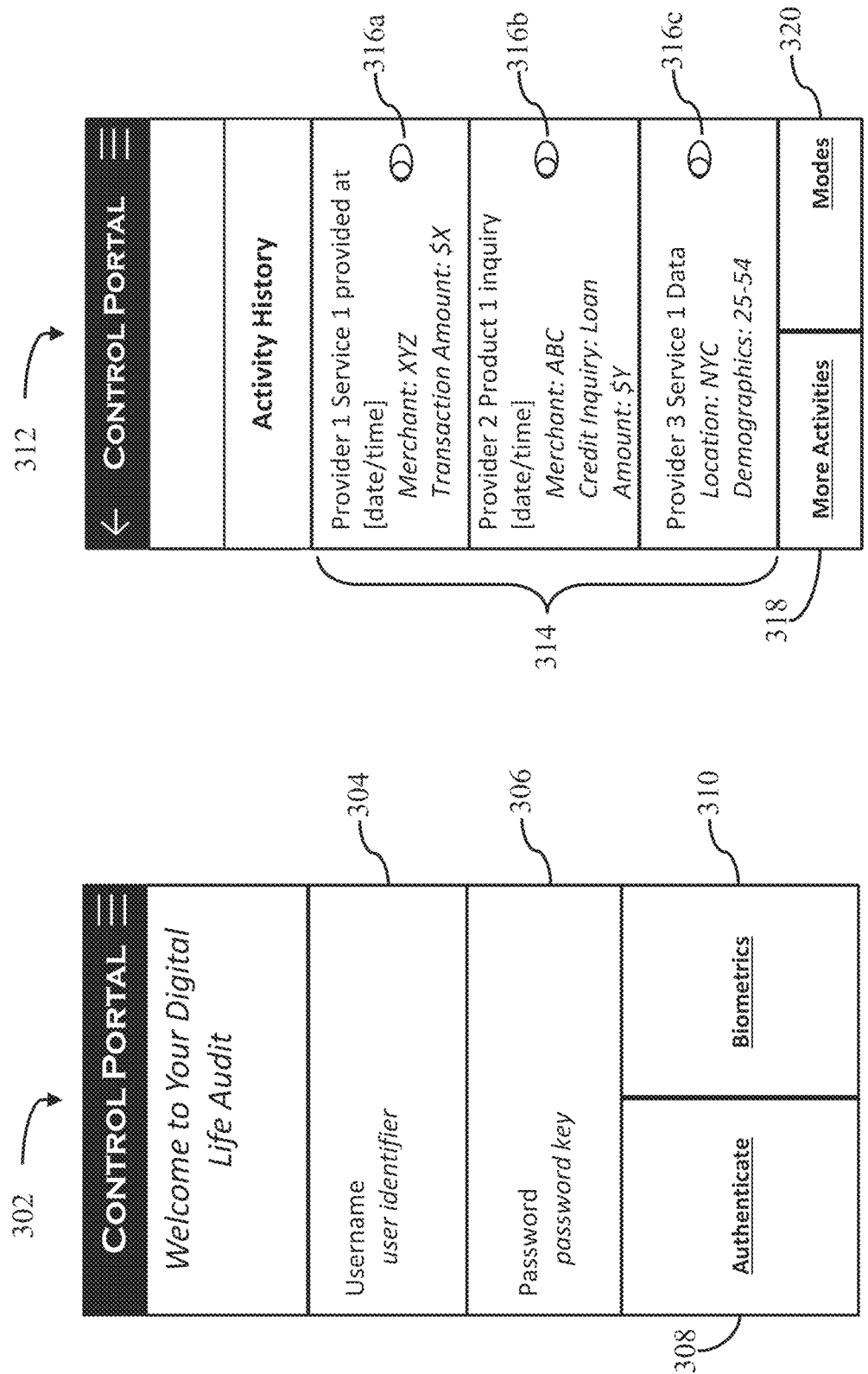
FIGS. 3A-3F provide example views in an example secure digital controls portal, according to various potential embodiments.
Figures 3C, 3D:
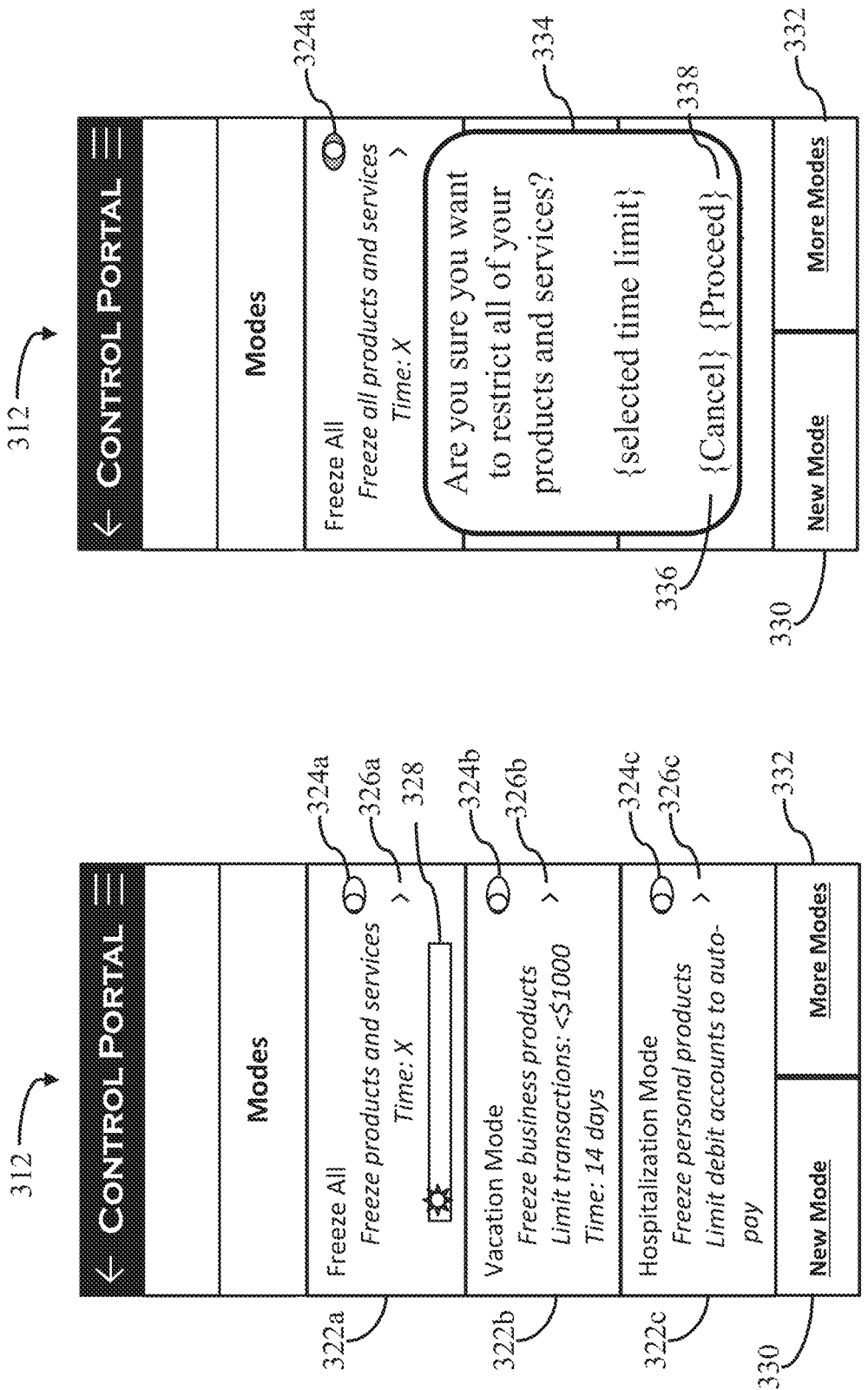
Figure 3F:
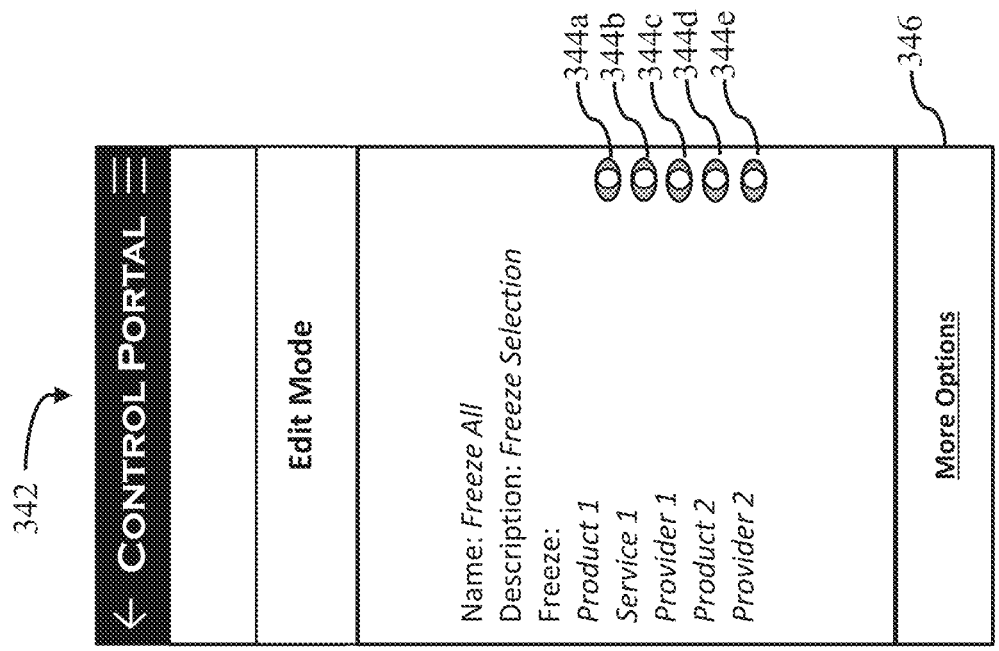

As depicted in FIG. 3F, the pre-set modes can be edited via the user device. Table 1 depicts an embodiment of various modes corresponding to functionality restrictions or activations that may be activated or deactivated by various sets of API protocols:

TABLE 1

Modes and restrictions, wherein 'X' represents a restriction of the service or product in the corresponding row responsive to activation of the mode in the column and "A" means "activation."

| Products and Services | Modes | | | |
|---|---|---|---|---|
| | Freeze All | Short Business Trip | Long Vacation | Hospitalization |
| Irregular payments from DDA accounts | X | | X | X |

TABLE 1-continued

Modes and restrictions, wherein 'X' represents a restriction of the service or product in the corresponding row responsive to activation of the mode in the column and "A" means "activation."

| | Modes | | | |
|---|---|---|---|---|
| Products and Services | Freeze All | Short Business Trip | Long Vacation | Hospital- ization |
| Irregular payments from credit cards accounts | X | | X | X |
| Payments processors | X | X | X | X |
| Investment/Retirement | X | X | X | X |
| Credit bureaus reports | X | | X | X |
| Government Accounts (e.g., IRS, SSA) | X | | | |
| Personal E-Mail | X | X | X | X |
| Social media accounts | X | X | X | X |
| E-commerce accounts | X | X | X | X |
| Vacation/travel accounts | X | X | | X |
| End-of-life services/grant an access to authorized parties | X | | | A |
| Medical records access | X | | | A |
| Online publications subscriptions & deliveries | X | | | |
| Hard copy publication subscriptions and deliveries | X | X | X | X |
| Delivery services suspension | X | X | X | X |
| Personal Data | X | | X | X |
| Business Data (Corporate portal or files) | X | X | X | X |

As depicted in Table 1, the "freeze all" mode corresponds to a restriction of all products and services (e.g., accounts) controllable by the system 110. For instance, all digital traffic and/or account activity (such as payments via financial accounts, emails via email accounts, etc.) can be restricted in the "freeze all" mode. In some embodiments, users can select the mode to freeze, restrict, or activate a subset of functionalities or operations related to each product or service. Furthermore, each restriction can be modified by the user based on settings available in the API. The "short business trip" mode corresponds to a restriction of products and services that may be unnecessary, non-essential, or impractical such as various deliveries, various utilities or related devices (e.g., Internet routers or specific channels or logins, certain lights or alarm settings, certain smart home devices), etc. For instance, a user can postpone the delivery of physical merchandise while the user is away, set air or water thermostat settings to certain values deemed suitable for an unoccupied residence, etc. Furthermore, the "short business trip" mode can request particular data policies for both personal and business products and services regardless of which provider computing system manages them. For example, the user may have a corporate e-mail service and a personal photo service managed by a particular provider computing system. Both services may be managed by the same provider computing system but nonetheless different and disconnected due to privacy policies and corporate regulations. Therefore, the "short business trip" mode can be configured to freeze or restrict the business digital footprint for someone before they depart on a business trip to limit their exposure during vulnerable periods of time at compromised locations, but keep personal data such as their photos available to look at during the trip. The "long vacation" mode similarly corresponds to a restriction of the "hard copy publication subscriptions and deliveries" but may also include an activation of "Medical records access" to be granted to preselected parties. A user can also refine the mode to include geographic restrictions, such as to restrict all electronic activity outside of the United States. In some embodiments, the authentication engine 128 verifies a request to activate (enable or "turn on") or deactivate (disable or "turn off") the mode, such as by receiving biometrics from the biometric scanner 210 or any of the other authentication functionality described herein.

The "hospitalization" mode corresponds to a combination of restrictions of various payment related services and products such as "payment processors", but activates services and products relating to "end-of-life" such as wills while allowing "online publications" to continue unrestricted. For instance, a user can elect to allow payments relating to utilities but restrict payments relating to entertainment. Similarly, the user can allow incoming payments to continue arriving in the user's accounts while restricting outgoing payments. While setting up the "hospitalization" mode, the user can select which products and services are accessible to third-party users or provider computing systems. For instance, the user can setup the "hospitalization" mode to notify authorized parties about the user's will and the living will in the case of the user's incapacitation. Accordingly, by integrating services and products with the user and authorized third parties, the "hospitalization" mode can preclude the risk that a user's last instructions may be lost, such as those relating to bank accounts and assets.

In some embodiments, the mode controller 126 can include time-based modes to restrict or activate certain API protocols for a certain amount of time. In some embodiments, the mode controller 126 includes time restriction mode corresponding to selectable visual elements and configured to activate the time restriction mode for the API set for a selected time. Different API protocols can be restricted for different amounts of time. In some embodiments, a mode is configured to restrict services or products associated with API protocols of an API set for a first amount of time. In certain embodiments, the second mode is configured to restrict services or products associated with API protocols of a second API set for a second amount of time, the second amount of time longer than the first amount of time.

In some embodiments, the mode controller 126 executes the first mode in response to detecting the first selection via the second visual interface of the dashboard engine 122. A second mode can correspond to executing all API protocols in the second API set. The second API set can be a combination of any of the services and products available via the service manager 112 or the product manager 114. For instance, the second API set can include financial services or products. In some embodiments, the second mode executes in response to detecting the second selection via the second visual interface of the dashboard. A third mode can correspond to a third API set, which can be a combination of any of the services and products available via the service manager 112 or the product manager 114, such as social media accounts systems. In some embodiments, the mode controller 126 executes the third API set in a third mode. In some embodiments, the mode controller 126 executes the third API set in a third mode in response to detecting the third selection via the second visual interface of the dashboard. In some embodiments, the user provides, via the GUI manager 124, locations or global positioning coordinates that can trigger the activation or deactivation of a mode.

The authentication engine 128 may be configured to verify identify and authorize access to the federated provider computing systems 102, the non-federated provider computing systems 104, and/or the system 110 (such as access to the dashboard engine 122, to external accounts at other institutions, etc.). The authentication engine 128 may use, for example, login credentials and biometric data acquired via user devices 106. In some embodiments, authentication engine 128 may authenticate users by verifying the identity of the user device 106 via, for example, its unique ID (such as a serial number) or other identifying information. In some embodiments, the authentication engine 128 can accept a user credential via the dashboard engine 122 and grant access to the system 110 in response to authenticating the user credential. In other embodiments, the authentication engine can authenticate an outside third party, such as the provider computing systems described herein, to access the system 110. For instance, a first provider computing system that detects fraudulent activity can automatically authenticate themselves and gain access to the system 110 and proceed to restrict functionalities, operations, provisioning, and/or delivery of products and/or services that may be compromised because of the fraudulent activity, such as on a second provider computing system interfacing with the system 110.

The AI engine 130 may be configured to analyze and combine inputs, make predictions on needs and modes, generate recommendations on service, product, and activity selection, or any other tasks associated with computer learning and/or problem solving. In some implementations, AI engine 130 may be used to understand human speech or decipher imagery captured, for example, via ambient sensors of user devices (further discussed below) to understand the situation and/or needs of one or more users of the dashboard engine 122.

The AI engine 130 may be configured to identify when a mode might be useful or beneficial based on electronic activities associated with the user device 106, for example, communications involving the users, purchase histories of users, or other activities or data points. The AI engine 130 can use the digital footprint and associated information available to the system 110 to analyze electronic activities to predict the mode. For example, an employee leaving for a vacation may prepare an email auto-response that is effective for a specific period of time. The AI engine 130 may detect the email auto-response by analyzing the business data or corporate e-mail linked via the API to the system 110, and execute a mode (such as the "long vacation" mode) to freeze or restrict this employee's access to internal data and software applications during the timeframe specified by their email auto-response.

The AI engine 130 can ascertain whether to automatically activate a mode described herein, such as the "hospitalization" as described by the mode controller 126. In some embodiments, the AI engine 130 can receive and track the location of the user device 106 and pro-actively activate and deactivate a mode if the user device 106 is at a location where a mode is activated or deactivated. In particular, the AI engine 130 may actively receive and track the global positioning coordinates transmitted by the user device 106, such that using or otherwise based on the global positioning coordinates, the AI engine 130 may determine the location of the user device. For instance, the AI engine 130 may automatically activate the hospitalization mode if the location sensor 214 of the user device 106 indicates that the user device 106 is located at a hospital or an IoT recorded that the car airbag has been activated and no outgoing user device 106 activity been observed since. Similarly, the AI engine 130 may deactivate a vacation mode when a location of the user device 106 indicates that the user device 106 is near a home address associated with the products or services. Proximity sensors of the location sensor 214 can also provide global positioning coordinates to the system 110, which can then determine if the user is at a location associated with an activation or deactivation.

The AI engine 130 can also receive audio files from the biometric scanner 210 to determine whether to activate or deactivate a mode. For instance, the audio files may include ambient noises, such as noises associated with a hospital or ambulance, so the AI engine 130 would then instruct or otherwise cause the mode controller 126 to activate the "hospitalization" mode described herein. As the biometric scanner 210 detects sounds in its surroundings and generate audios files (which may be the detected sounds themselves, or representations or encoded versions of the detected ambient sounds). The audio files may be transmitted to system 110, which may analyze the audio files to determine (using, e.g., AI engine 130) whether the user device 106 is in environment associated with the mode based on, for example, whether the sounds detected include a siren associated with a hospitalization mode. The audio files may correspond to sounds detected over a fraction of a second, a second, two or more seconds, or another time period deemed appropriate under the circumstances, and multiple audio files may be generated and transmitted to the user device 106 for multiple comparisons (e.g., in succession until a satisfactory determination can be made), in case multiple sound samples are required to gain confidence that the user device 106 is an environment associated with a mode. In some embodiments, the user devices 106 generates an audio file and transmits it to another user device associated with the system 110, such as a user of the system 110 or an authenticated back up user associated with the user device 106. For instance, audio files from a medical provider at a hospital can help the AI engine 130 verify that the user is hospitalized and in need of activation of the "hospitalization" mode.

The authentication engine 128 can authenticate the audio files to determine that they are associated with a trusted user. In particular, the GUI manager 124 can receive, from the user device 106, a selection of a trusted user to have authorization to perform certain functionalities via the system 110 on behalf of a user associated with the user device 106. In some embodiments, the authentication engine 128 can transmit, via the network interface 120, a token of credentials to the trusted user's device for accessing the system 110 on behalf of a user associated with the user device 106. The GUI manager 124 can receive selections from the user device 106 relating to customizing the access and/or control provided by or via the token. For instance, the selections can specify that the trusted user has access to products and services relating to trusts and wills, but no access to products and services relating to banking information. The authentication engine 128 can then receive the token from the trusted user's device to provide access based on the settings configured by the token. The authentication engine 128 can also receive ambient conditions or other electronic indicators to provide access to the trusted user. For instance, the audio files from a health care proxy or trusted user that has access to the hospitalized user's system 110 via the authentication engine 128 can indicate that the user is hospitalized and in need of activation of the "hospitalization" mode. Based on all these audio files and sound comparisons, the trusted user's device (e.g., a proxy user or "emergency contact/user") can be authenticated by proxy without additional user entry, and the AI engine 130 can determine which mode the user needs.

The AI engine 130 can also automatically generate modes based on electronic activities associated with the user device 106. For instance, the AI engine 130 may automatically generate a mode to restrict all payment activity if the biometric scanner 210 of the user device 106 indicates that audio associated with the user device 106 includes a phrase of "restrict all payment activity" mode. Any AI algorithms, logic, neural networks, or other tools may be used in implementing AI engine 130 for various desired purposes.

The API protocol manager 132 can affect, manage, and control the functionality of the services or products via executions of API protocols, which allow for communication with the federated provider computing systems 102, and/or the non-federated provider computing systems 104. In some embodiments, the API protocol manager 132 can configure functionalities of products and/or services managed by the system 110, such as by the service manager 112 or the product manager 114 operating within the system 110. By presenting electronic communications associated with multiple services and products, the API protocol manager 132 can facilitate efficient information management. For instance, if a user changes his or her credit card (or other electronic payment vehicle), the user can propagate the new credit card number to all the user's favorite merchants via a batch of APIs, each API of the batch corresponding to one of the merchant devices. Each batch of APIs can correspond to a category, such as a batch for social media account systems or another batch for e-commerce merchant systems. Each API protocol can facilitate specialized access between the system 110 and other computing systems, federated provider computing systems 102, and/or non-federated provider computing systems 104. In particular, the system 110 can, in the dashboard engine 122 and via the API protocols executed by the API gateway 134, control or manage services of any of the service managers 112 or products of any of the product managers 114 described herein. In some embodiments, the API protocols can retrieve data associated with the products or services, but not be able to configure, restrict, activate, or otherwise modify functionalities of the monitored product or service. For instance, the API protocol manager 132 can retrieve a credit score via an API protocol, but the API protocol manager 132 cannot modify or delete a credit score. However, the API protocol manager 132 can determine a related API protocol to modify functionality based on the credit score, such as to restrict functionality of products and/or services related to a credit score, such as product inquiries, credit cards, or mortgages.

In some embodiments, the API protocols can interface with the service manager 112 and the product manager 114 of the federated provider computing systems 102. In some embodiments, information or electronic activities of the service manager 112 and the product manager 114 of the non-federated provider computing systems 104 may be in a non-standardized format. For example, the information in the non-standardized format can be stored, presented, or accessed based on a software or hardware implementation that is incompatible with the APIs. Similarly, the non-standardized format may be a graphical presentation of the data in a graphical user interface without a corresponding data feed. Accordingly, the API protocols can interface and manage the service manager 112 and the product manager 114 of non-federated provider computing systems 104 if the information regarding electronic activities are standardized by the convertor 138 or stored in a standardized format in the electronic records 140.

Each of the plurality of API protocols can correspond to one or more unique provider computing systems (such as the federated provider computing system 102 or the non-federated provider computing system 104) that administer one or more functionalities, operations, and/or provisioning/delivery of user products and/or services via the service manager 112 in the product manager 114, respectively. Each API can have an authentication code or an action code. For instance, the API protocol manager 132 can transmit the authentication code to begin interfacing with a provider computing system, and then transmit an action code to modify access or settings of a product or service. The API protocol manager 132 can use API protocols for each product or service, and the API protocols received or set up by the federated provider computing system 102 or the non-federated provider computing system 104. In some embodiments, the services or products administered by the federated provider computing system 102 can provide a first functionality and a second functionality via a user portal of the federated provider computing system 102. The API protocol manager 132 can execute control via the API protocol to control the first and second functionality. For instance, the API protocol manager 132 can transmit, via APIs, a request to restrict products, services, or electronic activities selected by the GUI manager 124. In some embodiments, the API protocol manager can use one or more API protocols to disable one but not both first and second functionalities provided through the user portal of the federated provider computing system 102.

The API protocol manager 132 can assign API protocols in API sets to modes. In some embodiments, different combinations of API protocols can allow for a variety of control by product or service. For instance, the API protocol manager 132 can assign all API protocols to a first set and assign some API protocols to a second set that includes fewer API protocols than the first API set. In some embodiments, the API protocol manager 132 can assign API protocols associated with financial services or products to the second set of APIs. In some embodiments, the API protocol manager 132 can assign API protocols associated with social media products to a third set of APIs. In certain embodiments, the API protocol manager 132 can receive, via the second virtual interface associated with the GUI manager 124, the assignment request to assign one or more API protocols. For instance, the API protocol manager 132 can receive assignment request to assign financial products or services (or their functionalities) from the first API set to the third API set. The API protocol manager 132 can also reassign API protocols from one set to another. For instance, the API protocol manager 132 can receive an assignment request to re-assign one or more API protocols from the first API set to the second API set. API protocol manager 132 can receive the assignment request via the GUI manager 124 and its associated virtual interfaces such as the second virtual interface.

The API protocol manager 132 can manage API protocols based on time. In some embodiments, a mode of the mode controller 126 is configured to request the API protocol manager 132 to assign a restriction to services or products associated with API protocols of a particular API set for a predetermined amount of time. In some embodiments, the API protocol manager 132, upon determining that the predetermined amount of time has passed, execute the API protocols associated with the restricted services to remove the restriction from the restricted services or products. Based on the time indicated by the time-based mode of the mode controller 126 of the GUI manager 124, the API protocol manager 132 can transmit a time request to restrict digital account activity associated with the first API set based on the indicated time. In certain embodiments, the time request restricts digital account activity for a predetermined amount of time.

The API protocol manager 132 can add or remove API protocols from API sets. For instance, the API protocol manager 132 can add, in response to detecting a selection via a visual interface of the dashboard, a new API protocol of the new service to the first API set. The new API protocol can be associated with a new service or product. Similarly, the API protocol manager 132 can remove, in response to detecting a selection via a visual interface of the dashboard, one or more API protocols of the one or more services associated with the first API set. In some embodiments, the API protocol manager 132 can restrict all API protocols associated with a particular provider computing system such as the federated provider computing system 102 or the non-federated provider computing system 104. In some embodiments, the API protocol manager 132 can restrict the API protocols in response to detecting a selection via a visual interface. In some embodiments, the API protocol manager 132 can activate all API protocols associated with a particular service or product. For instance, the API protocol manager 132 can activate all API protocols associated with the newly added service or product. In some embodiments, the API protocol manager 132 can activate API protocols in response to detecting a selection via a visual interface. After adding, removing, activating, or modifying an API protocol associated with service or product, the API protocol manager 132 can notify an associated provider computing system or instruct or otherwise cause the notification engine 142 to notify an associated user. For instance, the API protocol manager 132 can notify a bank that their account is linked for managing by the system 110 and instruct or otherwise cause the notification engine 142 to notify the user of the bank.

Since the API protocol manager 132 may already be interfacing with products or services of the user, many of the products or services associated with a user can be presented immediately when they begin to use the system 110. Therefore, the dashboard engine 122 can present a way for a user to learn about their digital life (digital footprint) such as by indicating shared user information, functionalities or provisioning of products and/or services that are not restricted or that cannot be easily restricted and see gaps and holes in the user's data management. The dashboard engine 122 thus provides a digital account life audit that indicates every product or service associated with the user in the information exchanged, and the list the accessible information such as credit cards or social media account systems, and the extent to which information is accessible to providers, computing systems, or other third parties. Therefore, the dashboard engine 122 indicates which functionalities of the products and/or services are detected, restricted, missing, or otherwise unknown to the user. Accordingly, the dashboard engine 122 can provide a digital life audit of all electronic activities associated with a user for all their products or services.

The API gateway 134 can facilitate the exchange of information, electronic activities, or records via the APIs between the system 110 and the federated provider computing systems 102 or non-federated provider computing systems 104. The API gateway 134 can facilitate a direct connection to the service manager 112 and product manager 114 of the federated provider computing system 102. In particular, the API gateway 134 can facilitate a connection between any of the service managers 112 or products of any of the product managers 114 described herein. The API gateway 134 can receive data or electronic activities of the services or products in real time or according to a predetermined schedule. The API gateway 134 can also immediately receive electronic activities of a service or product added via the GUI manager 124. In some embodiments, the API gateway 134 can receive API protocols set up or configured by the federated provider computing system 102 or the non-federated provider computing system 104. In some embodiments, the API gateway 134 can receive information or electronic activities of the service manager 112 and the product manager 114 of the non-federated provider computing systems 104 in a non-standardized format. Accordingly, the API gateway 134 can route the electronic activities in the non-standardized format to the convertor 138 for conversion to a standardized format that can be stored in the electronic records 140.

The API database 136 can store the API protocols, sets of API protocols, and associations between API protocols and modes. The API database 136 can use RAM, ROM, NVRAM, Flash Memory, or hard disk storage to store data and/or computer code for facilitating at least some of the various processes described herein, as well as one or more data repositories. For instance, a first API set can include APIs for provider computing systems administering both financial accounts and non-financial accounts. A second API set can include APIs for provider computing systems administering only financial accounts. A third API set can include APIs for provider computing systems administering only non-financial accounts. In some embodiments, the API database 136 includes predetermined APIs that can interface with partnered provider computing systems such as the federated provider computing system 102.

The convertor 138 can convert electronic activities in a non-standardized format into a standardized format. As further depicted in FIGS. 5A and 5B, the non-federated provider computing systems 104 can present or display electronic activities in a variety of formats. The formats may depend on various software (e.g., Windows, iOS, Android, Linux, etc.) or hardware (e.g., GPU, CPU, server, mainframe, cloud, etc.) used by the non-federated provider computing systems 104. Accordingly, the convertor 138 can receive, from the non-federated provider computing systems 104 electronic activities of the service manager 112 or the product manager 114 in a non-standardized format dependent on a hardware and a software platform used by the non-federated provider computing systems 104. In some embodiments, the convertor 138 receives the electronic activities through one of the API protocols managed by the API protocol manager 132 and operated by the API gateway 134. In some embodiments, the convertor 138 can convert the electronic activities from the non-standardized format into a standardized format. In some embodiments, the convertor 138 applies an optical character recognition algorithm to parse electronic activities from screenshots or GUI systems of non-federated provider computing systems 104.

The standardized electronic activities can then be presented by the dashboard engine 122. In some embodiments, the convertor 138 can store the electronic activities in the standardized format in a collection of electronic records 140. As further depicted in FIG. 3B or 4B, the convertor 138 can present the collection of electronic records such as activity history relating to various products or services maintained by various entities or third parties. The convertor 138 can present the electronic records via the dashboard engine 122. In some embodiments, the convertor 138 can instruct or otherwise cause the user device 106 to verify or associate an electronic activity with a provider, service, or product. The convertor 138 can then receive, via the GUI manager 124, a request to associate the electronic activity with a selected provider, service, or product. The convertor 138 can store the electronic activity in the electronic records 140, or if the electronic activity is in a non-standardized format, then the convertor 138 can convert the electronic activity into a standardized format. The convertor 138 can store the electronic activity in the electronic records 140. In some embodiments, the convertor 138 converts the electronic activities in the standardized format to a non-standardized format. In some embodiments the convertor 138 converts electronic activities that are stored in the electronic records 140.

The convertor 138 may convert the electronic activities or configurations to the non-standardized format in response to a request to configure functionalities, operations, provisioning, and/or delivery of an account, product, and/or service maintained by a non-federated provider computing system 104. In some embodiments the request can be from the mode controller 126, the AI engine 130, or the API protocol manager 132. For instance, the system 110 may receive a request to restrict functionalities, operations, provisioning, and/or delivery of an account, a product, and/or a service maintained by a provider computing system (such as the non-federated provider computing system 104) operating software and hardware that is incompatible with the APIs in the API database. After the electronic activities or configurations have been converted to the non-standardized format, the API protocol manager 132 or the notification engine 142 can configure functionalities, operations, and provisioning of the products and/or services managed by provider computing systems operating various software and hardware. For instance, the API protocol manager 132 can configure the non-federated provider computing system 104 and the notification engine 142 can transmit a request to the non-federated provider computing system 104.

The electronic records 140 is structured to maintain and monitor electronic activities of services and products associated with the federated provider computing systems 102 or the non-federated provider computing systems 104. The electronic records 140 can use RAM, ROM, NVRAM, Flash Memory, or hard disk storage to store data and/or computer code for facilitating at least some of the various processes described herein, as well as one or more data repositories. For instance, the electronic records 140 can be a network-based non-transitory storage device having a collection of electronic records stored thereon. The electronic records 140 may store electronic activities such as transaction data and account information, including account numbers, account balances, user contact information, user preferences, security access tokens and other account information. As used herein, the term "transaction data" may be used to refer to data associated with a transaction such as, but not limited to, a payment, transfer, debit, credit, contribution, donation, etc., which may be associated with the product or service. The electronic records 140 can maintain electronic activities in a standardized format. The electronic records 140 can associate electronic activities of one or more users of the system 110 to their electronic activities relating to the federated provider computing systems 102 or the non-federated provider computing systems 104. For instance, the electronic activities can be associated with the one or more services or products of the federated provider computing systems 102 or the non-federated provider computing systems 104.

The notification engine 142 can transmit notifications and alerts to a user device 106 of the system 110. The notifications can relate to the electronic activities associated with the service manager 112 or the product manager 114. The notification may be any of a text message, an automated telephone call, an e-mail, an in-application push notification, or a combination thereof.

The notification engine 142 can transmit a notification indicating that fraudulent activity was detected with respect to the user information. In some arrangements, the notification identifies a specific product or service associated with the fraudulent activity. For example, the notification may indicate that a service is attempting to access a piece of user information that is out of the norm of access patterns associated with the service. In some arrangements, the notification is user-interactive such that a reply to the notification can be received from the user device 106 (e.g., by interacting with a hyperlink, by interacting with embedded buttons, by replying, etc.) to indicate that the potentially fraudulent activity was unauthorized or authorized, and to engage a mode to manage the activities associated with the services or products. For instance, the notification may be responsive to receiving a selection, via the mode controller 126, for a restriction of API sets. In certain embodiments, the notification engine 142 can generate and transmit a notification to each provider or user device 106 associated with a particular API set to indicate that various services or products are restricted for a predetermined amount of time. For instance, the notification engine 142 can transmit timely notifications to user devices 106 about upcoming expiration times of credit freezes, restrictions, locks, and fraud alerts.

The notification engine 142 can transmit notifications indicating the availability of data. For instance, notification engine 142 can generate and transmit a notification containing the electronic activities in the standardized format of the collection of electronic records 140. The notification engine 142 can generate and transmit the notification responsive to the convertor 138 converting electronic activities from a non-standardized format and into a standardized format and storing the electronic activities in the standardized format in the electronic records 140. In certain embodiments, the notification engine 142 transmits notifications over a network. By transmitting the notifications over the network, one or more user devices 106 associated with the electronic activities can have up-to-date access to electronic activities. For instance, the notification engine 142 can transmit notifications to the user devices 106 about significant credit reports or FICO credit score changes.

The I/O interface 144 can allow the system 110 to be configured by third-party or an administrator. For instance, I/O interface 144 can include anything used to communicate with users such as input devices (e.g., keyboard, mouse, touchscreen, microphone for voice prompts, notification LEDs, buttons, switches, etc.) and output devices (e.g., display screens, speakers for sound emission, etc.) deemed suitable for operation of the system 110. The administrator or third-party can configure any of the functionalities of the system 110 described herein.

Figure 2:
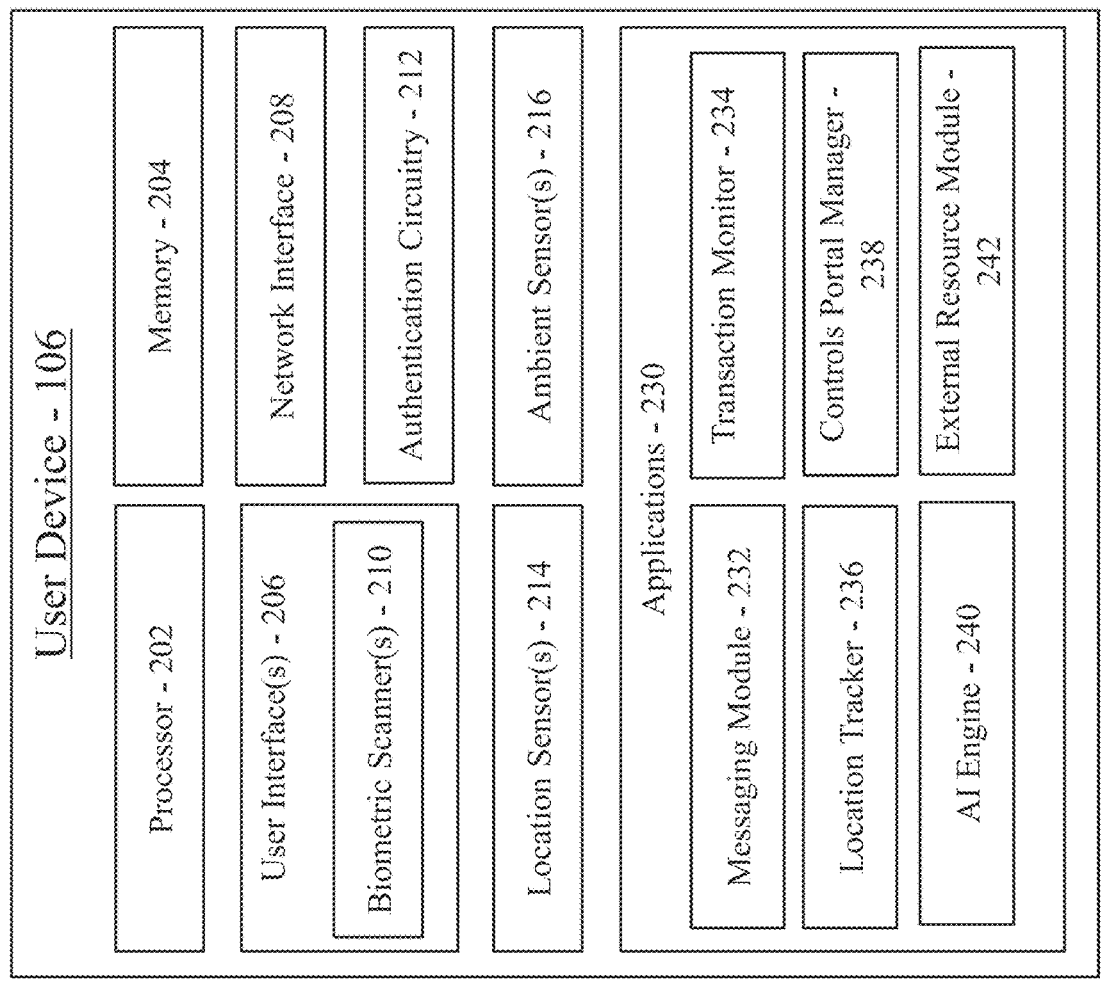
FIG. 2 is a block diagram of an example user device, according to various potential embodiments.

Referring to FIG. 2, a block diagram of the user device 106 is shown according to various potential example embodiments. Each user device 106 may include a processor 202, a memory 204, user interfaces 206, and a network interface 208. The processor 202 may be implemented as a general-purpose processor, an ASIC, one or more FPGAs, a DSP, a group of processing components, or other suitable electronic processing components structured to control the operation of the user device 106. The memory 204 (e.g., RAM, ROM, NVRAM, Flash Memory, hard disk storage) may store data and/or computer code for facilitating at least some of the various processes described herein, as well as one or more data repositories (which may include, e.g., database records such as user data and acquired information). In this regard, the memory 204 may store programming logic that, when executed by the processor 202, control the operation of the user device 106. For instance, the programming logic can control the operating system of the user device 106, applications 230 loaded on the user device 106. The user interfaces 206 include anything used to communicate with users such as input devices (e.g., keyboard, mouse, touchscreen, microphone for voice prompts, notification LEDs, buttons, switches, etc.) and output devices (e.g., display screens, speakers for sound emission, etc.) deemed suitable for operation of the device 106. The network interface 208 may be structured to allow the device 106 to communicate data to and from other systems (e.g., via network 108) either directly or indirectly. The network interface 208, which may be a wireless network interface, may include any of a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). Additionally, the network interface 208 can communicate with the system 110 via the network 108 (e.g., via any combination of the internet, cellular networks, personal area networks, Wi-Fi networks, etc.). The user devices 106 may be mobile and non-mobile computing devices of one or more users and/or third parties (i.e., any entities other than the service provider associated with the system 110).

User device 106 may also include one or more biometric scanners 210, such as fingerprint scanners, cameras for facial, retinal, or other scans, microphones for voice signatures, etc. In conjunction with, or separate from, the biometric scanners 210, each user device 106 may include authentication circuitry 212 to allow the user device 106 to engage in, for example, financial transactions (such as payments mobile payment and digital wallet services) in a more secure manner. Various user devices 106 may include one or more location sensors 214 to enable user device 106 to determine its location relative to other physical objects or relative to geographic locations. Example location sensors 214 include global positioning system (GPS) devices and other navigation and geolocation devices, digital compasses, gyroscopes and other orientation sensors, as well as proximity sensors or other sensors that allow the user device 106 to detect the presence and distance of nearby objects. User device 106 may also include ambient sensors 216 that allow for the detection of sound and imagery, such as cameras (e.g., visible, infrared, etc.) and microphones, in the surroundings of device 106. It is noted that a device's microphone is an ambient sensor that may be used as a biometric scanner if it is involved in recording the voice of a user for authentication.

Each user device 106 may include one or more applications 230 ("apps") that aid the user device 106 in its operations and/or aid users of the user device 106 in performing various functions with the user device 106. As used herein, applications 230 can also interface with operating systems of the user device 106. In some embodiments, the applications 230 can display, present, or otherwise replicate the functionality associated with the system 110. Applications 230 may be stored in memory 204 and executed using processor 202, and may interact with, or otherwise use, one or more user interfaces 206, network interface 208, biometric sensors 210, authentication circuitry 212, location sensors 214, and/or ambient sensors 216. Example components of one or more applications 230 include a messaging module 232 configured to send and receive messages (which may be in the form of text, sounds, images, video, etc.) via, for example, electronic text messages (SMS or otherwise), electronic mail (e-mail) messages (accessed via browsers, mail applications, etc.), notifications (such as banners) or sound alerts, etc. The messaging module 232 can be a standalone application or part of the operating system of the user device 106. A transaction monitor 234 is configured to identify and keep track of financial or other transactions. A user may engage in transactions using, e.g., mobile payment and digital wallet services, or via any app and/or device through which a user may make purchases, transfers, deposits, cash advances, etc. The transaction monitor 234 may access such services and applications to obtain transaction data.

A location tracker 236 may be configured to track (using, e.g., one or more location sensors 214) the physical location of the user device 106. The location tracker 236 may be configured to identify the location of the user device at specified points in time or when triggered by identified events, such as the location of the user device 106 when a purchase occurs, when a device is turned on or off, when an application is launched, etc. The location of user device 106 may be presumed to correspond with the location of one or more users associated with the user devices 106, and/or the location at which an event occurred. In different implementations, location may be determined without using location sensors 214. For example, location of user device 106 may be determined by identifying the location of a merchant device at which a purchase occurred using a payment app on user device 106. Additionally, or alternatively, location may be determined using other sensors, such as ambient sensors 216 used to detect sounds and videos that are recognized as indicative of a certain physical location of the user device 106 (such as the sounds heard over a public announcement system of a particular landmark such as a train station or airport).

Applications 230 may also include a controls portal manager 238 that may be implemented in addition to or in place of the dashboard engine 122 of the system 110. The controls portal manager 238 may maintain some or all circle data locally in one or more memories 204 of user device 106, and it may also transmit some or all the data acquired via user devices 106 to the system 110.

Applications 230 of user devices 106 may also include an AI engine 240 configured to analyze and combine inputs, make predictions on transactions and goals, generate recommendations on modes, or any other tasks associated with computer learning and/or problem solving. In some implementations, AI engine 240 may include a chat bot that is used to understand human speech captured via a microphone of ambient sensors 216 to understand the situation and/or needs of one or more users (or potential users) using the dashboard engine 122. In some implementations, AI engine 240 may be configured to identify when a particular mode might be useful or beneficial based on, for example, discussions involving users or merchants, behaviors of other users, etc. In some embodiments, the AI engine 240 can interface with the AI engine 130. Various artificial intelligence algorithms, logic, neural networks, and/or other tools may be used in implementing AI engine 240 for various desired purposes.

Applications 230 may additionally include an external resource module 242 configured to access, retrieve, process, and use data from information sources other than the user device 106. This may include travel websites, merchant websites, and other sources of information on expenses and costs of goods and/or services. In some implementations, the external resource module 242 may access a data source that may provide information on interbank exchange rates, allowing users to better track purchasing power when traveling abroad. In certain implementations, the external resource module 242 may access social networking websites for information on, for example, life events and familial or other relationships to propose formation of modes with products or services, to better predict needs (via, e.g., AI engine 240 and/or AI engine 130), etc. The external resource module 242 may also access other sources of information, such as credit agencies, news sources, financial institutions, governmental bodies, and other sources.

Although the above discussion identifies a set of modules that perform specified functions, in various implementations, the above (and other) functions may be performed by any module in the system 100. Functions collectively performed by system 110 and/or user devices 106 in the above discussion may thus be redistributed (i.e., differently apportioned or distributed) among the modules of the system 110 and user devices 106, consolidated into fewer modules, or expanded such that they are performed by a greater number of (separate) modules than illustrated above. Similarly, functions performed by the above modules of one or more systems 110 may additionally or alternatively be performed by modules of one or more user devices 106, and functions performed by the above modules of one or more user devices 106 may additionally or alternatively be performed by modules of one or more systems 110.

The GUI manager 124 can present a plurality of virtual interfaces to manage, operate, and control the system 110. For instance, a first virtual interface can allow the authentication engine 128 to receive credentials to grant access to the system 110. As depicted in FIG. 3A, the first virtual interface 302 can include an entry for username 304 and password 306. Selecting the authenticate 308 can cause the GUI manager 124 to instruct or otherwise cause the authentication engine 128 authenticate the username 304 and the password 306. Selecting biometrics 310 causes the GUI manager 124 to instruct or otherwise cause the authentication engine 128 authenticate the user via biometrics such as those received form the biometric scanner 210. The biometrics can simplify and secure the log in to the portal by the user. Furthermore, by logging in to the system 110 to configure the products and services, the user does not need to log into each individual third-party system or user device to manage, secure, control, or restrict user information. Accordingly, the system 110 can be all-inclusive system that controls an entire digital footprint of the user to protect the user's reputation and minimize opportunities for digital identity or account takeover, fraud, or misuse.

Now referring to FIG. 3B, a second virtual interface 312 can include a plurality of selectable visual elements relating to electronic activities 314 of products and services. The GUI manager 124 can present the second virtual interface 312 responsive to the user gaining access to the system 110. In some embodiments, the GUI manager 124 can present the electronic activities of products and services in the second virtual interface 312. The GUI manager 124 can receive a selection 316a-316c of any of the electronic activities to restrict the electronic activity. Selecting "more activities" 318 can instruct or otherwise cause the GUI manager 124 to retrieve additional electronic activities available to the system 110. Selecting "modes" 320 can instruct or otherwise cause the GUI manager 124 to show the modes relating to managing functionalities of the products and services available to the system 110.

Now referring to FIG. 3C, the second virtual interface 312 can include the modes 322a-322c. The GUI manager 124 may show the modes 322a-322c responsive to receiving a selection of "modes" 320. One or more of the selectable visual elements can correspond to modes of the mode controller 126. For instance, a first selectable visual element 324a can correspond to the first mode 322a, so the first selectable visual element that is configured to indicate a first selection to activate the first mode. A second selectable visual element 324b can correspond to the second mode and that is configured to indicate a second selection to activate the second mode 322b. In some embodiments, the second virtual interface further includes a third selectable visual element 324c that corresponds to a third mode and that is configured to indicate a third selection to activate the third mode 322c. The GUI manager 124 can receive a selection 326a-326c of any of the modes to edit the selected mode. A fourth selectable visual element 328 can be configured to indicate a fourth selection to restrict a particular provider computing system, service, product, or associated electronic activity for a particular time. Selecting "new mode" 330 can instruct or otherwise cause the GUI manager 124 to show a screen for generating a new mode. Selecting "more modes" 332 can instruct or otherwise cause the GUI manager 124 to show additional modes relating to managing functionalities or operations of the products and/or services available to the system 110.

Now referring to FIG. 3D, the second virtual interface 312 can include validation 334 to confirm a selection of the first mode 322a by the first selectable visual element 324a, and depict the time selected via the fourth selectable visual element 328. The GUI manager 124 can display selectable elements corresponding to a cancellation 336 to cancel the selection of the first mode 322a, or a proceed 338 to validate the selection of the first mode 322a.

Figure 3E:
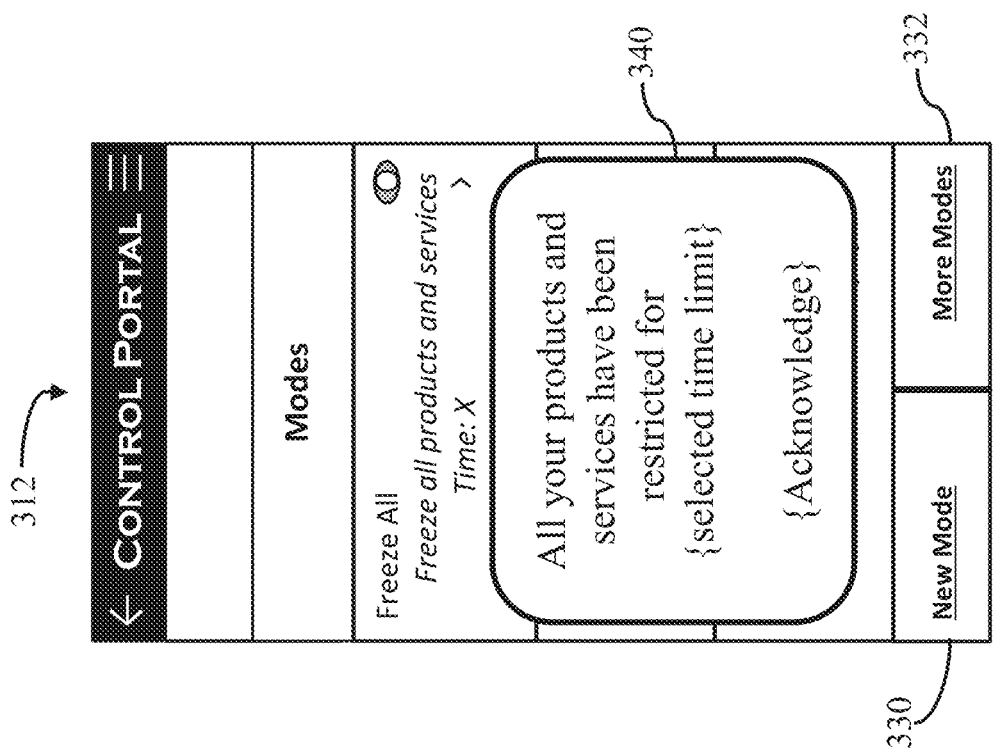

Now referring to FIG. 3E, the second virtual interface 312 can include confirmation 340 to confirm a selection of the first mode 322a by the first selectable visual element 324a, and depict the time selected via the fourth selectable visual element 328. In some embodiments, the GUI manager 124 shows the confirmation 340 responsive to validating the request via validation 334 or the proceed 338.

Now referring to FIG. 3F, the GUI manager 124 can include a virtual interface 342 to edit modes, such as mode 322a. The GUI manager 124 can display and receive edits to the name and description of the mode 322a. In some embodiments, the virtual interface 342 includes selectable visual elements 344a-344e that correspond to at least one of the one or more federated provider computing systems 102, non-federated provider computing systems 104, or associated products or services. In some embodiments, the selectable visual elements 344 corresponds to at least one of the one or more products or services. The selectable visual elements 344 can indicate can be configured to indicate a selection to add a new product or service associated with the one or more federated provider computing systems 102 or non-federated provider computing systems 104 to the mode of the system 110. The GUI manager 124 can instruct or otherwise cause the API protocol manager 132 to prepare an API to interface with the added product or service. The selectable visual elements 344 can be configured to indicate a selection to remove functionalities of the one or more products or services from the mode of the system 110. The selectable visual elements 344 can also correspond to at least one of the federated provider computing systems 102 or the non-federated provider computing systems 104. The selectable visual elements 344 can be configured to indicate a third selection to restrict all the services or products associated with the federated provider computing systems 102 or the non-federated provider computing systems 104. The selected services or products can be associated with the electronic activities stored in the electronic records 140. In certain embodiments, selectable visual elements 344 can correspond to at least one of the one or more services or products. Accordingly, selecting the selectable visual elements 344 can freeze, restrict, or manage all electronic activities across many providers, products, and services. The virtual interface 346 can also include a selectable element for "more options", which can correspond to additional logical and categorical restrictions of products or services. For instance, a listing and freezing of products and services that monitor a location or personal attributes of a user device 106 to provide content specifically tailored to the user device 106. Accordingly, the GUI manager 124 may provide an option to restrict functionalities such as advertising targeting or location-based targeting, or restrict products or services from accessing a location of the user device 106 altogether. The API protocol manager 132 can transmit all these instructions and instruct or otherwise cause configuration of the associated products or services.

Referring now to FIGS. 4A-4F, a notification interface 400 is shown, according to various potential embodiments. The notification interface 400 may be rendered on the user device 106 via the applications 230 on the user device 106. The notifications can be received from the notification engine 142. In some embodiments, the notifications presented herein are presented by the operating system of the user device 106. In some embodiments, the notifications can appear on a home screen of the user device 106 as maintained by the operating system, or within any other application. Additionally, notification interfaces like the notification interface 400 may be displayed on various other user devices 106 while the notification interface 400 is presented via the user mobile device 106. As such, the user device 106 receives a notification of the detected fraudulent activity irrespective of the user device 106 online at the time the unusual activity is detected, and the notification transmitted. In this regard, fraud alerts in other forms are envisioned. For example, the system 110 may formulate a sound notification and transmit the sound notification to a user device 106 that includes a smart speaker. Similarly, a push notification can be transmitted (e.g., via push notification server) to a smartphone, a wearable (e.g., smartwatch), a smart speaker, and/or other user devices 106.

Figures 4A, 4B, 4C:
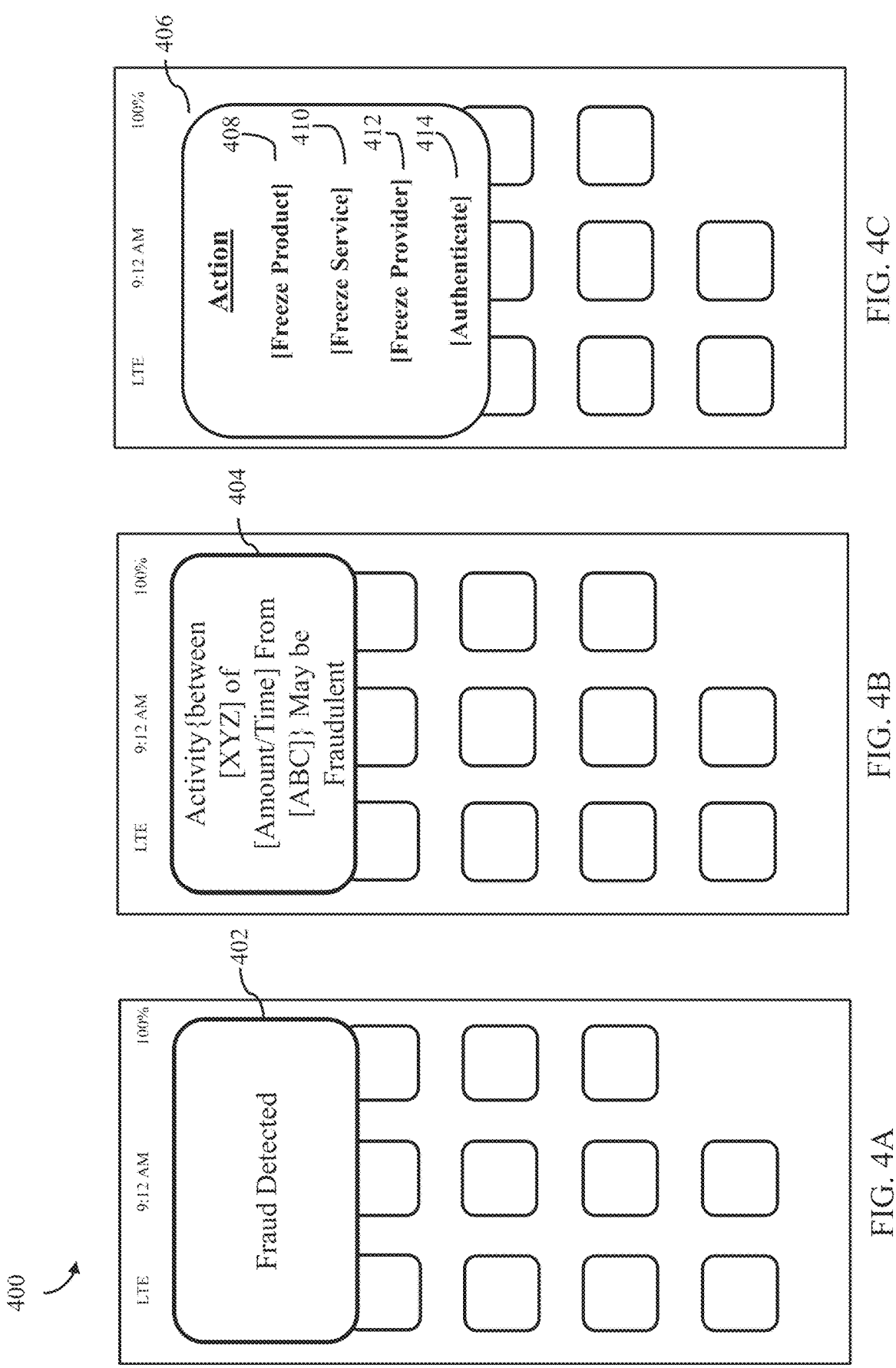
FIGS. 4A-4F provide example views of alerts and actions in the secure digital controls portal, according to various potential embodiments.

Referring now to FIG. 4A, presented is example push notification including a general description 402 of the notification. Referring now to FIG. 4B, presented is an activity description 404 of the notification. In some embodiments, the activity description 404 may be shown responsive to receiving a selection or haptic input associated with the general description 402.

Referring now to FIG. 4C, presented is an action description 406. In some embodiments, the action description 406 may be shown responsive to receiving a selection or haptic input associated with the general description 402 or the activity description. The action description 406 may contain one or more options. For instance, a freeze product option 408 can freeze, as similarly described in reference to the mode controller 126, the activity associated with the general description 402 or the activity description 404. A freeze service option 410 can freeze, as similarly described in reference to the mode controller 126, all activities or functionalities associated with the account corresponding to the product or service associated with the general description 402 or the activity description 404. A freeze provider option 412 can freeze, as similarly described in reference to the mode controller 126, all activities associated with the provider corresponding to the activity with the general description 402 or the activity description 404. A fourth action option 414 can authenticate, verify, or indicate the legitimacy of the activity associated that caused delivery of the notification associated with the general description 402 or the activity description 404. In some embodiments, the user device 106 can defer the verification process to a later time.

Figures 4D, 4E, 4F:
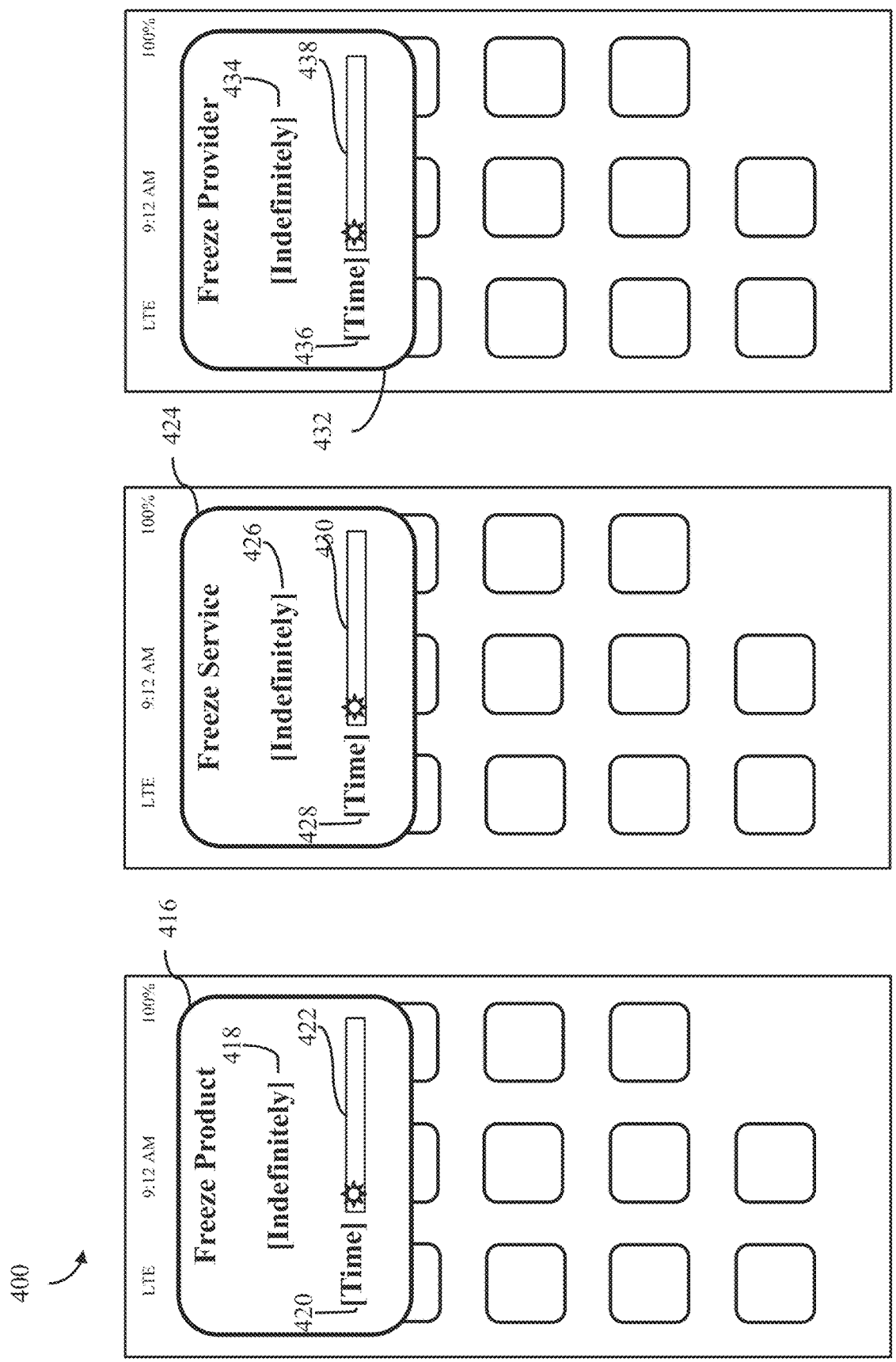

Referring now to FIG. 4D, presented is a freeze product action 416. In some embodiments, the freeze product action 416 may be shown responsive to receiving a selection or haptic input associated with the freeze product option 408. The freeze product action 416 may contain one or more options. For instance, an indefinite freeze option 418 can freeze, as similarly described in reference to the mode controller 126, the activity associated with the general description 402 or the activity description 404 for an indefinite time. A time freeze option 420 can freeze, as similarly described in reference to the mode controller 126, the activity associated with the general description 402 or the activity description 404 for a predetermined amount of time modulated by slider 422.

Referring now to FIG. 4E, presented is a freeze service action 424. In some embodiments, the freeze service action 424 may be shown responsive to receiving a selection or haptic input associated with the freeze service option 410. The freeze service action 424 may contain one or more options. For instance, an indefinite freeze option 426 can freeze, as similarly described in reference to the mode controller 126, the service associated with the general description 402 or the activity description 404 for an indefinite time. A time freeze option 428 can freeze, as similarly described in reference to the mode controller 126, the activity associated with the general description 402 or the activity description 404 for a predetermined amount of time modulated by slider 430.

Referring now to FIG. 4F, presented is a freeze provider action 432. In some embodiments, the freeze provider action 432 may be shown responsive to receiving a selection or haptic input associated with the freeze provider option 412. The freeze provider action 432 may contain one or more options. For instance, an indefinite freeze provider option 434 can freeze, as similarly described in reference to the mode controller 126, the provider associated with the general description 402 or the activity description 404 for an indefinite time. A time freeze option 436 can freeze, as similarly described in reference to the mode controller 126, the activity associated with the general description 402 or the activity description 404 for a predetermined amount of time modulated by slider 438.

Now referring to FIGS. 5A and 5B, depicted are example views of electronic activities in a non-standardized format from non-federated provider computing systems 104, according to various potential example embodiments. The non-federated provider computing systems 104 may merely provide their own GUI systems or screenshots depicting electronic activities relating to products or services. For instance, FIG. 5A depicts an anomalous and/or problematic payment, and FIG. 5B provides details for a provider requesting user information. FIG. 5A can include the alert 502 and the transaction details 504. FIG. 5B can include, for example, applicant section 506 with applicant details 508, affiliation/authorization details 510, application initiation time/date 512, application authorization request time/date 514, and items delivered/accessible section 516, which may include an item code 518 (such as a temporary pin or payment code) and delivered/accessible electronic files 520 (e.g., audio, images, video, documents, taxes, etc.). However, the convertor 138 can convert the information from FIGS. 5A and 5B to a standardized format and store it in the electronic records 140. For instance, the convertor 138 can extract the products and services, and their associated electronic activities from FIGS. 5A and 5B, and store extracted information in the electronic records 140.

Figure 6B:
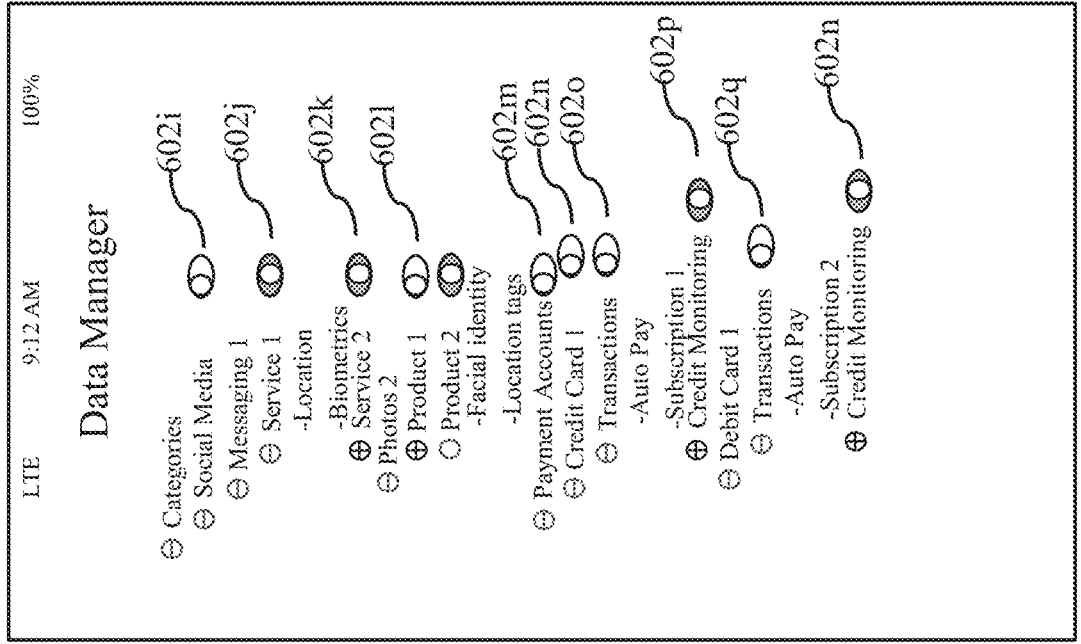
FIGS. 6A and 6B provide example views of electronic activities in a standardized format in the secure digital controls portal, according to various potential embodiments.
Figure 6A:
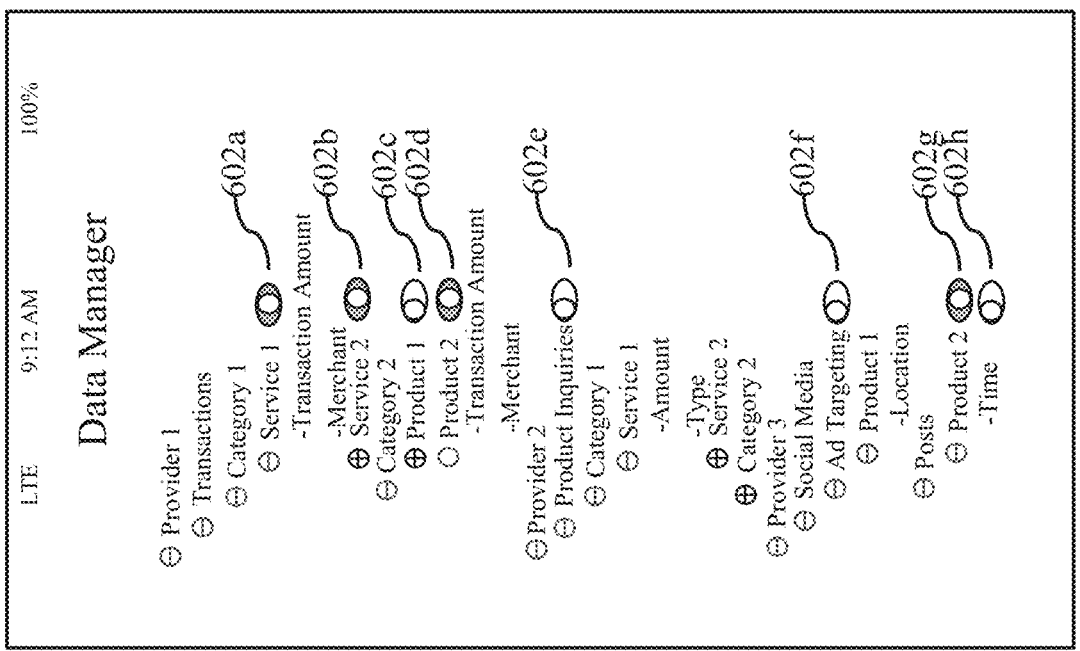

Now referring to FIGS. 6A and 6B, depicted are example views of electronic activities in a standardized format in the system 110, according to one or more example embodiments. The electronic activities in a standardized format can be presented via the I/O interface 144 or by the dashboard engine 122. The I/O interface 144 or the dashboard engine 122 can present the electronic activities by provider, product, or service. The provider, products, or services are also presented with selectable elements 602a-602n, which can enable or disable the product or service to access to personal data, or any other functionality associated therefrom.

Figure 7:
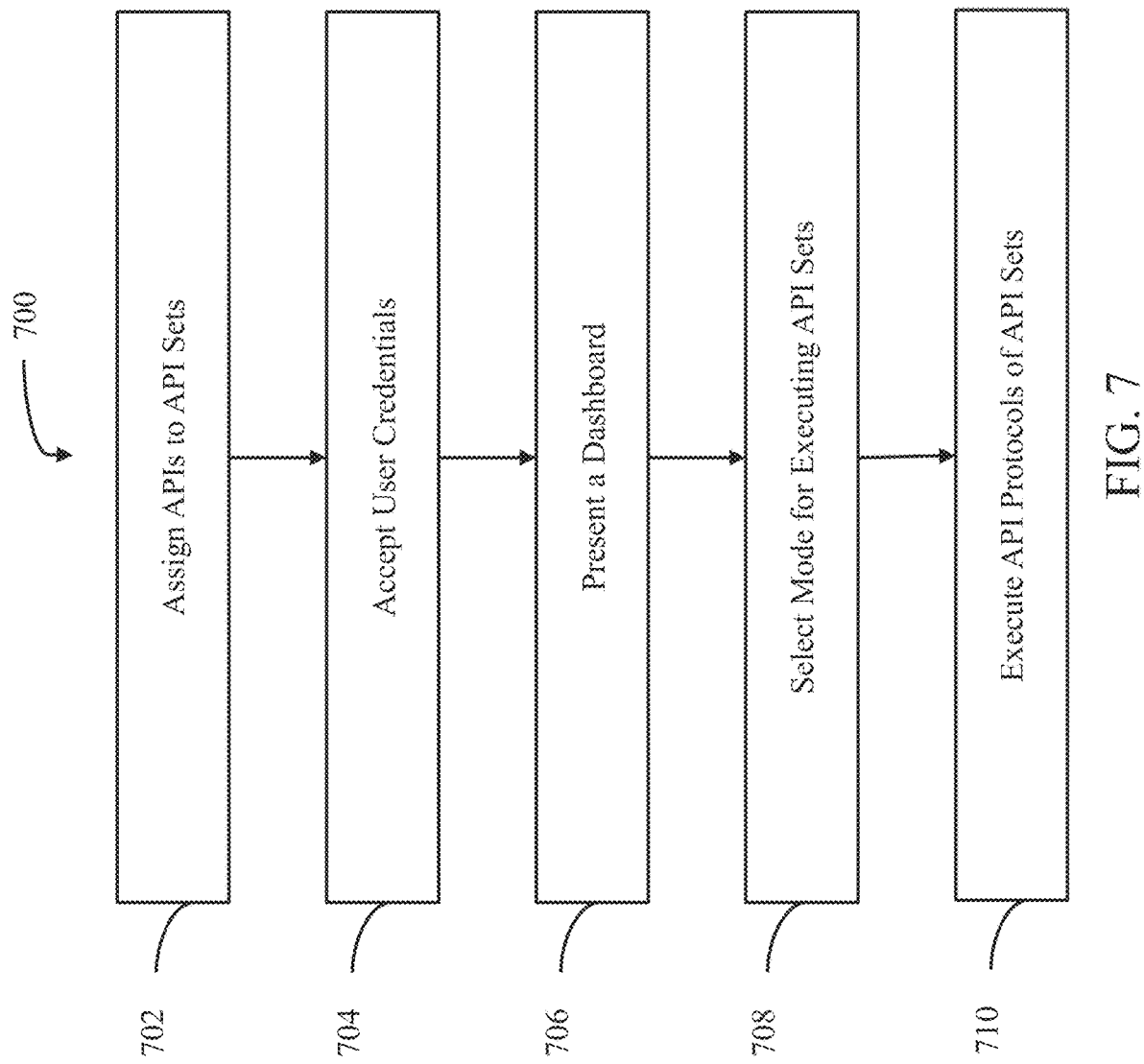
FIG. 7 is a flow diagram of an example method for managing functionalities of products or services maintained by provider computing systems and APIs sets, according to various potential embodiments.

FIG. 7 is a flow diagram of a method 700 for managing functionalities or provisioning of products and/or services maintained by provider computing systems, according to various potential embodiments. The method can be a computer-implemented method of accessing one or more services of one or more computing systems over a network using integration of one or more API protocols. Method 700 may be implemented using the system 110, and particularly, by the processor 116. As such, reference will be made to the system 110 when describing method 700. In another embodiment, at least portions of method 700 may be performed by the user device 106. In another embodiment, additional, fewer, and/or different operations may be performed. It will be appreciated that the order or flow of operations indicated by the flow diagrams and arrows with respect to the methods described herein is not meant to be limiting. For example, in one embodiment, two or more of the operations of method 700 may be performed simultaneously.

At operation 702, the system 110 assigns a plurality of API protocols in a first API set to a mode. For instance, the API protocol manager 132 can assign APIs from the API database 136 to various modes controlled by the mode controller 126. In various embodiments, the API protocols can allow for communication with the federated provider computing systems 102, and/or the non-federated provider computing systems 104. For instance, if a user changes his or her credit card (or other electronic payment vehicle), the user can propagate the new credit card number to all the user's favorite merchants via a set of APIs, each API of the set corresponding to one of the merchant devices. Each set of APIs can correspond to a category or a mode, such as a set for social media account systems or another set for the vacation mode. Each API protocol can facilitate specialized access between the system 110 and other computing systems, federated provider computing systems 102, and/or non-federated provider computing systems 104.

At operation 704, the system 110 accepts a user credential to authenticate the user to grant access to the system 110. For instance, the dashboard engine 122 instructs or otherwise causes a presentation of the virtual interface to receive a credential from a user. The GUI manager 124 can present the virtual interface. The GUI manager 124 can transmit the virtual interface to the user device 106 via the network interface 120. The GUI manager 124 can receive, via the network interface 120, the credential from the user device 106. The credential can be based on passwords or biometrics, such as from the biometrics scanner 210. The authentication engine 128 can authenticate the user device 106.

At operation 706, the system 110 presents a dashboard including one or more virtual interfaces. The dashboard engine 122 can present the dashboard. The GUI manager 124 can present an interface depicting electronic activities or functionalities associated with the products or services. The GUI manager 124 can also present a virtual interface depicting modes of operation. The mode controller 126 can control the modes. The modes correspond to restrictions and allowances of electronic activities or functionalities of associated products and/or services.

At operation 708, the system 110 selects a mode for executing API sets. A selected mode can activate various rules associated with the mode such as restrictions of various products and services. For instance, a mode can restrict products or services relating to payment activities or products or credit inquiries. The system 110 can receive a selection of the mode from the user device 106. The selection can occur in the virtual interface presented by the dashboard engine 122. In some embodiments, the AI engine 130 can automatically activate or select the mode. For instance, the AI engine 130 can select a mode based on time, location, or audio signal. The location or audio signal may be received from the user device 106. The AI engine 130 can also select a mode based on electronic activities or functionalities associated with products and/or services. For instance, if an electronic activity is suspicious, then the AI engine 130 activates a mode corresponding to the restriction of related products and services. The system 110 may receive electronic activities via the network interface 120 or the API gateway 134. Some electronic activities are in a non-standardized format, so the convertor 138 converts these electronic activities to a standardized format and stores them in electronic records 140. In some embodiments the notification engine 142 can contact the user device 106 to confirm the selection of a mode.

At operation 710, the system 110 executes API protocols corresponding to the mode selected in operation 708. Based on the mode selected in operation 708, the mode controller 126 can implement the mode. For instance, the mode controller 126 can instruct or otherwise cause the API protocol manager 132 to execute APIs associated with products or services being configured. The API protocol manager 132 can retrieve APIs corresponding to functionalities of the products and/or services from the API database 136. The API protocol manager 132 can then use the API gateway 134 to interface with the service managers 112 or the product managers 114. In some embodiments the notification engine 142 can contact the user device 106 to confirm the implementation of a mode. In some embodiments, the convertor 138 can covert the configurations associated with the mode. The converted configurations can be transmitted by the network interface 120 to non-federated provider computing systems 104 to configure functionalities or operations of the products and/or services.

Figure 8:
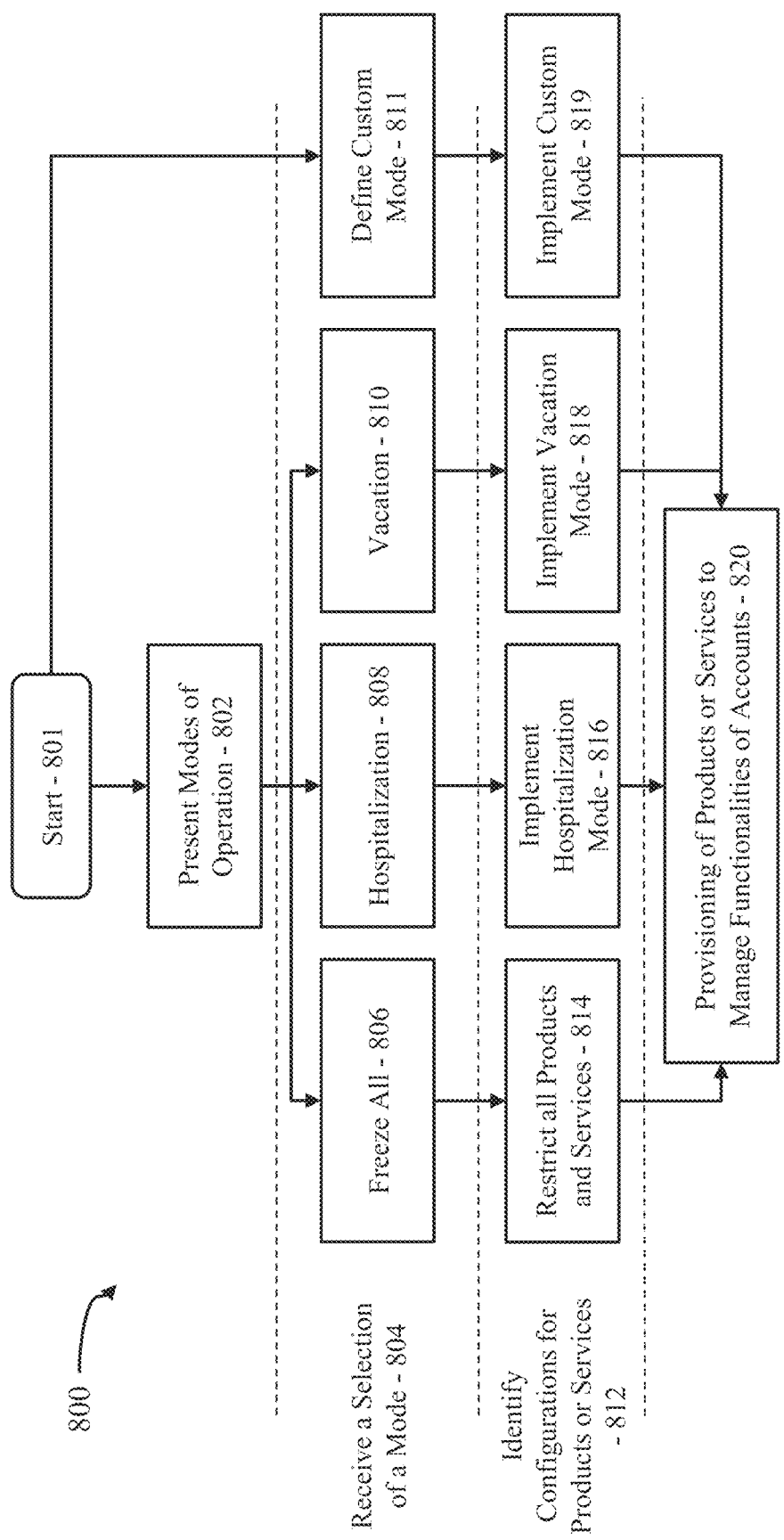
FIG. 8 is a flow diagram of an example method of mode-based access for maintaining functionalities of products or services maintained by provider computing systems, according to various potential embodiments.

FIG. 8 is a flow diagram of method 800 of mode-based access for managing functionalities of products and/or services maintained by provider computing systems, according to various potential embodiments. The method 800 can be a computer-implemented method of accessing one or more services of one or more computing systems over a network using integration of one or more API protocols. Method 800 may be implemented using the system 110, and particularly, by the processor 116. As such, reference will be made to the system 110 when describing method 800. In another embodiment, at least portions of method 800 may be performed by the user device 106. In another embodiment, additional, fewer, and/or different operations may be performed. It will be appreciated that the order or flow of operations indicated by the flow diagrams and arrows with respect to the methods described herein is not meant to be limiting. For example, in one embodiment, two or more of the operations of method 800 may be performed simultaneously.

At operation 801, the system 110 presents a virtual interface. For instance, the system 110 can present a virtual interface for a user device 106 to login to the system 110. The system 110 can receive authentication credentials from the user device 106 via the virtual interface. The authentication engine 128 can authenticate the user credentials to grant access to the system 110.

At operation 802, the system 110 presents modes of operation. In particular, the dashboard engine 122 can present the modes of operation. The GUI manager 124 can present the modes in various interfaces. The mode controller 126 can control and manage the modes. The modes correspond to restrictions and allowances of electronic activities or functionalities of products and/or services. The modes can respond to restricting functionalities of products, services, or providers in a certain location or at a certain time.

At operation 804, the system 110 receives a selection of a mode. In particular, the GUI manager 124 can receive a selection of a mode from the user device 106 or automatically by the AI engine 130. The selection can be done through the touch interface or biometric command such as an audio request sent by the user device 106.

At operation 806, the system 110 receives a selection of the freeze all mode. The freeze all mode can instruct or otherwise cause a restriction of all products and services controllable by the system 110. For instance, all digital traffic or electronic activities relating to payments, checks, emails, or targeted advertising can be restricted in the "freeze all" mode.

At operation 808, the system 110 receives a selection of the hospitalization mode. The hospitalization mode can instruct or otherwise cause a restriction of products and services that may be unnecessary to a user in the hospital. For instance, the hospitalization mode can restrict targeted advertising or monthly subscriptions while the user is in the hospital. Similarly, the hospitalization mode can activate certain services or products, such as granting access to the user's wills to preauthorized parties. In some embodiments, the hospitalization mode is activated responsive to location of the user device 106 indicating that the user is at the hospital. Similarly, audio information from the user device 106 may indicate that the users in the hospital and automatically select the hospitalization mode.

At operation 810, the system 110 receives a selection of the vacation mode. The vacation mode can instruct or otherwise cause a restriction of products and services that may be unnecessary to user on vacation, such as physical delivery services. Similarly, the vacation mode can restrict payment activity in certain locations or be set to expire after a predetermined amount of time. In some embodiments, vacation mode can be deactivated responsive to detecting the user at their home address.

At operation 811, the system 110 receives a selection to define a custom mode. The system 110 can present a virtual interface to generate a new mode or edit an existing mode. In particular, the GUI manager 124 can display and receive entries for the name and description of the mode. The GUI manager 124 can also display and receive selections of at least one of the one or more federated provider computing systems 102, non-federated provider computing systems 104, or associated products and/or services. The GUI manager 124 can also display and receive entries to categorically select products or services, such as all social media account systems. The GUI manager 124 can instruct or otherwise cause the API protocol manager 132 to generate an API to interface with the selected products or services.

At operation 812, the system 110 identifies configurations for products or services based on the selections of operations 806-811. The mode controller 126 can identify configurations for products and services associated with each mode. The API protocol manager 132 and receive the configurations from the mode controller 126 and then identify APIs for implementing the mode in the API database 136 interface with services or products to implement the mode. The convertor 138 can convert the configurations to contact the non-federated provider computing systems 104. Similarly, the notification engine 142 can generate and transmit relevant notifications to the user device 106, the service manager 112, and/or the product manager 114.

At operation 814, the system 110 restricts all products and services responsive to a selection in operation 806. For instance, mode controller 126 can identify that a configuration for the freeze all mode is the restriction of all products and services. The API protocol manager 132 can retrieve all the API protocols from the API database 136 and execute them via the API gateway 134 to restrict the functionalities of products and/or services. The convertor 138 can convert the configurations to instruct or otherwise cause the non-federated provider computing systems 104 to restrict all the functionalities of the products and/or services. Similarly, the notification engine 142 can generate and transmit notifications relating to the freezing of the products or services to the user device 106, the service manager 112, or the product manager 114.

At operation 816, the system 110 implements the hospitalization mode responsive to a selection in operation 808. For instance, mode controller 126 can identify that a configuration for the hospitalization mode is the restriction of monthly subscriptions and the activation of wills. The API protocol manager 132 can retrieve, from the API database 136, the API protocols corresponding to the monthly subscriptions and wills, and then execute them via the API gateway 134 restrict the functionalities of products and/or services. If the monthly subscriptions and wills are managed by non-federated provider computing systems 104, the convertor 138 can convert the configurations and instruct or otherwise cause the non-federated provider computing systems 104 to implement the configuration. Similarly, the notification engine 142 can generate and transmit notifications relating to the hospitalization mode to the user device 106, the service manager 112, or the product manager 114.

At operation 818, the system 110 implements the vacation mode responsive to a selection in operation 810. For instance, mode controller 126 can identify that a configuration for the vacation mode is the restriction of delivery services and payment activity in certain locations for a predetermined amount of time. The API protocol manager 132 can retrieve, from the API database 136, the API protocols corresponding to the delivery services and payment accounts, and then execute them via the API gateway 134 to restrict the functionalities of products and/or services. If the delivery services and payment accounts are managed by non-federated provider computing systems 104, the convertor 138 can convert the configurations and instruct or otherwise cause the non-federated provider computing systems 104 to implement the configuration. Similarly, the notification engine 142 can generate and transmit notifications to the user device 106 or the product or service managers relating to the vacation mode.

At operation 819, the system 110 restricts all products and services responsive to a selection in operation 811. For instance, mode controller 126 can identify that a configuration for the custom mode includes the restriction of newspaper delivery for a predetermined amount of time and the activation of an international wireless data plan. The API protocol manager 132 can retrieve, from the API database 136, the API protocols corresponding to the newspaper and wireless carrier, and then execute them via the API gateway 134 to restrict the newspaper delivery and activate the wireless data plan. If the newspaper and wireless carrier are managed by non-federated provider computing systems 104, the convertor 138 can convert the configurations and instruct or otherwise cause the non-federated provider computing systems 104 to implement the restriction of newspaper delivery for a predetermined amount of time and the activation of an international wireless data plan. Similarly, the notification engine 142 can generate and transmit notifications to the user device 106 or the product or service managers relating to the implementation of the custom mode.

At operation 820, the system 110 manages functionalities of products and/or services. The system 110 can maintain the mode for a predetermined amount of time. For instance, the system 110 can keep a hospitalization mode active until a location of the user device corresponds to a home address of the user. Similarly, the system 110 can activate the vacation mode if the user device 106 is in another country. The system 110 can also routinely confirm the configuration of a mode, such as by instructing or otherwise causing the user device 106 to confirm daily the freezing all their electronic activities.

FIG. 9 is a flow diagram of a method 900 for creating a new mode for managing functionalities of products and/or services maintained by provider computing systems, according to various potential embodiments. The method can be a computer-implemented method of accessing one or more services of one or more computing systems over a network using integration of one or more API protocols. Method 900 may be implemented using the system 110, and particularly, by the processor 116. As such, reference will be made to the system 110 when describing method 900. In another embodiment, at least portions of method 900 may be performed by the user device 106. In another embodiment, additional, fewer, and/or different operations may be performed. It will be appreciated that the order or flow of operations indicated by the flow diagrams and arrows with respect to the methods described herein is not meant to be limiting. For example, in one embodiment, two or more of the operations of method 900 may be performed simultaneously.

At operation 902, the system 110 presents modes of operation. In particular, the dashboard engine 122 can present the modes of operation. The GUI manager 124 can present the modes in various interfaces. The mode controller 126 can control and manage the modes. The modes correspond to restrictions and allowances of electronic activities or functionalities of products and/or services. The modes can respond to restricting functionalities of products, services, or providers in a certain location or at a certain time.

At operation 904, the system 110 receives an instruction or request to generate a new mode. The request can be received from the user device 106 or the AI engine 130. For instance, the user device 106 can instruct or otherwise cause a mode that restricts functionalities of social media products and/or services. The AI engine 130 can restrict a mode to limit payment activities or credit scores responsive to detecting suspicious electronic activities associated with the products or services accessible to the system 110.

At operation 906, the system 110 presents products and services. The products and services can be presented by the dashboard engine 122 in a variety of interfaces managed by the GUI manager 124. In some embodiments, the system 110 presents electronic activities associated with the mode. For instance, the system 110 can display all payments associated with a credit card product, or user data shared with an advertising service.

At operation 908, the system 110 receives selections of products and services. The system 110 can receive, from the user device 106, configurations for the presented products and services. For instance, the configurations for a mode can be to restrict a product and activate a service. The configurations can be location, time, or audio based. For instance, products and services can be activated or deactivate in certain location, for a predetermined amount of time, or responsive to receiving an audible command.

At operation 910, the system 110 configures a new mode with the selected products and services. The mode controller 126 identifies the selected products and services for the mode. The mode controller 126 can instruct or otherwise cause the API protocol manager 132 to prepare APIs for implementing the mode. The API protocol manager 132 can generate relevant APIs and store them to the API database 136. The mode controller 126 can similarly instruct or otherwise cause the convertor 138 and network interface 120 to prepare an interfacing mechanism with the non-federated provider computing systems 104 associated with the selected products or services. The mode controller 126 can also instruct or otherwise cause the notification engine 142 to prepare notifications associated with the mode. In some embodiments, the new mode can be further configured by a third party or administrator via the I/O interface 144.

At operation 912, the system 110 stores the new mode. In particular, the mode controller 126 can maintain and store the mode. The mode can then be presented by the dashboard engine 122 in various interfaces managed by the GUI manager 124.

FIG. 10 is a flow diagram of a method 1000 for managing functionalities of products and/or services maintained by provider computing systems, according to various potential embodiments. The method 1000 can be a computer-implemented method of accessing one or more services of one or more computing systems over a network using integration of one or more API protocols. Method 1000 may be implemented using the system 110, and particularly, by the processor 116. As such, reference will be made to the system 110 when describing method 1000. In another embodiment, at least portions of method 1000 may be performed by the user device 106. In another embodiment, additional, fewer, and/or different operations may be performed. It will be appreciated that the order or flow of operations indicated by the flow diagrams and arrows with respect to the methods described herein is not meant to be limiting. For example, in one embodiment, two or more of the operations of method 1000 may be performed simultaneously.

At operation 1002, the system 110 identifies products, services, or providers for restriction or activation. For instance, the system 110 may be implementing a mode previously described herein and can thus identify products, services, or providers for restriction or activation as per the mode. In particular, the mode controller 126 can identify functionalities of the products or services. For instance, the mode controller 126 can identify certain e-commerce delivery services for restriction based a vacation mode.

At operation 1004, the system 110 identifies configurations for the identified products or services. For instance, the mode controller 126 can identify that the e-commerce delivery service should be restricted while the location of the user device 106 is not at the address associated with the e-commerce delivery service. Similarly, the system 110 can identify a user configuration to freeze all electronic activities for a predetermined amount of time.

At operation 1006, the system 110 determines whether the identified products or services are associated with a federated provider computing system 102. The method 1000 proceeds to operation 1008 if the products or services are associated with a federated provider computing system 102. The method 1000 proceeds to operation 1012 if the products or services are associated with a non-federated provider computing system 104.

At operation 1008, the system 110 retrieves API protocols of products or services. In particular, the mode controller 126 can instruct or otherwise cause the API protocol manager 132 to retrieve, from the API database 136, APIs for implementing the mode.

At operation 1010, the system 110 executes API protocols to interface with the federated provider computing system 102. In particular, the API protocol manager 132 can execute the API protocols and interface, via the API gateway 134, with the federated provider computing system 102.

At operation 1012, the system 110 converts configurations into a format associated with an non-federated provider computing system 104. In particular, the mode controller 126 can instruct or otherwise cause the convertor 138 to convert the configurations. For instance, the convertor 138 can convert the configurations into a message format, and the instruct or otherwise cause the notification manager 142 to transmit a message, email, alert, or call to the provider of the product or service to implement the functionality specified by the configuration. The mode controller 126 or the convertor 138 can also instruct or otherwise cause the network interface 120 to prepare an interfacing mechanism with the non-federated provider computing system 104. The mode controller 126 can also instruct or otherwise cause the notification engine 142 to prepare notifications associated with the mode.

At operation 1014, the system 110 transmits converted configurations to the non-federated provider computing system 104. In particular, the network interface 120 or API gateway 134 can communicate with the non-federated provider computing system 104. For instance, the network interface 120 or API gateway 134 can transmit electronic activities in a format compatible with the non-federated provider computing system 104. The system 110 can receive, from the non-federated provider computing system 104, an acknowledgement or additional data relating to the configuration or electronic activity in a non-standardized format depending on the hardware and software used by the non-federated provider computing system 104.

At operation 1016, the system 110 manages functionalities of the account, product or service. The system 110 can implement modes managing functionalities of products or services relating to the federated provider computing system 102 or the non-federated provider computing system 104.

The system 110 can also implement the mode for as long as a predetermined amount of time or location requirement of the user device 106 is satisfied. For instance, the system 110 can maintain a restriction of all electronic activities for all products and services for the time specified by the user. The system 110 can also routinely confirm the configuration of a mode, such as by requesting the user device 106 to confirm that a certain mode is to persist (e.g., freezing of all electronic activities) on a periodic basis (e.g., daily).

It is noted that any of the features, selectors, icons, functionalities, information, elements, or other aspects of any one interface or figure may be combined or swapped with or applied to any of the features, selectors, icons, functionalities, information, elements, or other aspects of any other interface or figure.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by volatile or non-volatile memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible considering the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system for providing a secure digital account controls portal, the system comprising:
   a memory having computer-executable instructions; and
   one or more processors configured to execute instructions to cause the system to:
      assign, to a first mode, a plurality of API protocols in a first API set, each of the plurality of API protocols corresponding to (i) one or more unique provider computing systems that administer one or more services, and (ii) one or more functionality restrictions for each service;
      assign, to a second mode, a subset of the plurality of API protocols in a second API set comprising fewer API protocols than the first API set;
      accept a user credential via a first virtual interface, and grant access to a digital controls portal in response to authenticating the user credential;
      present, via the digital controls portal, a dashboard comprising a second virtual interface comprising:
         a first selectable visual element that corresponds to the first mode and that is configured to indicate a first selection to activate the first mode;
         a second selectable visual element that corresponds to the second mode and that is configured to indicate a second selection to activate the second mode; and
         a third selectable visual element that corresponds to a third mode and that is configured to indicate a third selection to activate the third mode; and
      perform at least one of:
         (A) executing, in response to detecting the first selection via the second virtual interface of the dashboard, all API protocols in the first API set;
         (B) executing, in response to detecting the second selection via the second virtual interface of the dashboard, all API protocols in the second API set; or
         (C) executing, in response to detecting the third selection via the second virtual interface of the dashboard, API protocols in a third API set, the third API set having API protocols associated with financial accounts.

2. The system of claim 1, wherein the first API set comprises APIs for provider computing systems administering both the financial accounts and non-financial accounts.

3. The system of claim 2, wherein one of the provider computing systems is a financial institution computing system, wherein one of the API protocols corresponds to the financial institution computing system, wherein one of the financial accounts is administered by the financial institution computing system and provides a first functionality and a second functionality via a user portal of the financial institution computing system, and wherein executing corresponding API protocol disables one but not both of the first and second functionalities provided through the user portal of the financial institution computing system.

4. The system of claim 1, wherein the instructions, when executed by the one or more processors, further cause the one or more processors to receive, via the second virtual interface, an assignment request to assign one or more API protocols associated with the financial accounts from the first API set to the third API set.

5. The system of claim 1, wherein the instructions, when executed by the one or more processors, further cause the one or more processors to:
   present, via the digital controls portal, the dashboard comprising a third virtual interface comprising:
      a third selectable visual element that corresponds to at least one of the one or more unique provider computing systems and that is configured to indicate a third selection to add a new service associated with the one or more unique provider computing systems; and
      a fourth selectable visual element that corresponds to at least one of the one or more services and that is configured to indicate a fourth selection to remove the one or more services; and
   perform at least one of:
      add, in response to detecting the third selection via the third virtual interface of the dashboard, a new API protocol of the new service to the first API set; or
      remove, in response to detecting the fourth selection via the third virtual interface of the dashboard, one or more API protocols of the one or more services associated with the first API set.

6. The system of claim 1, wherein the instructions, when executed by the one or more processors, further cause the one or more processors receive, via the second virtual interface, an assignment request to re-assign one or more API protocols from the first API set to the second API set.

7. The system of claim 1, wherein the instructions, when executed by the one or more processors, cause the one or more processors to:
present, via the digital controls portal, the dashboard comprising a third virtual interface with:
a third selectable visual element that corresponds to at least one or more unique provider computing systems and that is configured to indicate a third selection to restrict the one or more services associated with the one or more unique provider computing systems; and
a fourth selectable visual element that corresponds to at least one of the one or more services and that is configured to indicate a fourth selection to restrict the one or more services; and
perform at least one of:
(C) restricting, in response to detecting the third selection via the third virtual interface, all API protocols associated with the at least one of the one or more unique provider computing systems; or
(D) activating, in response to detecting the fourth selection via the third virtual interface, all API protocols associated with the at least one of the one or more services.

8. The system of claim 1, wherein the first mode is configured to restrict electronic activities associated with the first API set.

9. The system of claim 1, wherein the second mode is configured to assign a restriction to services associated with API protocols of the second API set for a predetermined amount of time, and wherein the instructions, when executed by the one or more processors, further cause the one or more processors to, upon determining that the predetermined amount of time has passed, execute the API protocols associated with the restricted services to remove the restriction from the restricted services.

10. The system of claim 9, wherein the instructions, when executed by the one or more processors, further cause the one or more processors to generate and transmit an alert to each provider associated with the second API set to indicate the restriction for the predetermined amount of time.

11. The system of claim 1, where in the second mode is configured to restrict services associated with API protocols of the second API set for a first amount of time.

12. The system of claim 11, where in the second mode is configured to restrict services associated with API protocols of the second API set for a second amount of time, the second amount of time longer than the first amount of time.

13. The system of claim 1, wherein the instructions, when executed by the one or more processors, further cause the one or more processors to:
present, via the second virtual interface, a third selectable visual element that corresponds to a time restriction mode and that is configured to indicate time to activate the time restriction mode for the first API set; and
transmit a time request to restrict digital account activity associated with the first API set based on the indicated time.

14. The system of claim 13, wherein the time request restricts the digital account activity for a predetermined amount of time.

15. The system of claim 1, wherein the instructions, when executed by the one or more processors, cause the one or more processors to:
receive, from the one or more unique provider computing systems through the plurality of API protocols, electronic activities of the one or more services in a non-standardized format dependent on a hardware and a software platform used by the one or more unique provider computing systems;
convert the electronic activities from the non-standardized format into a standardized format;
store the electronic activities in the standardized format in a collection of electronic records; and
present, via the digital controls portal, the collection of electronic records.

16. The system of claim 15, wherein the instructions, when executed by the one or more processors, further cause the one or more processors to:
generate a notification containing the electronic activities in the standardized format of the collection of electronic records responsive to storing the electronic activities in the standardized format; and
transmit, over a network, the notification to one or more users associated with the electronic activities so that each user has access to up-to-date electronic activities.

17. A computer-implemented method of accessing one or more services of one or more computing systems over a network using integration of one or more API protocols, the method comprising:
assigning, to a first mode, a plurality of API protocols in a first API set, each of the plurality of API protocols corresponding to (i) one or more unique provider computing systems that administer one or more services, and (ii) one or more functionality restrictions for each service;
assigning, to a second mode, a subset of the plurality of API protocols in a second API set comprising fewer API protocols than the first API set;
accepting a user credential via a first virtual interface, and granting access to a digital controls portal in response to authenticating the user credential;
presenting, via the digital controls portal, a dashboard comprising a second virtual interface with:
a first selectable visual element that corresponds to the first mode and that is configured to indicate a first selection to activate the first mode;
a second selectable visual element that corresponds to the second mode and that is configured to indicate a second selection to activate the second mode;
a third selectable visual element that corresponds to a third mode and that is configured to indicate a third selection to activate the third mode; and
executing at least one of:
(A) all API protocols in the first API set in response to detecting the first selection via the second virtual interface of the dashboard; or
(B) all API protocols in the second API set in response to detecting the second selection via the second virtual interface of the dashboard
(C) API protocols in a third API set in response to detecting the third selection via the second virtual interface of the dashboard, the third API set having API protocols associated with financial accounts.

18. The method of claim 17, further comprising:
receiving, from the one or more unique provider computing systems through the plurality of API protocols, electronic activities of the one or more services in a non-standardized format dependent on a hardware and a software platform used by the one or more unique provider computing systems;

converting the electronic activities from the non-standardized format into a standardized format;

storing the electronic activities in the standardized format in a collection of electronic records; and presenting, via the digital controls portal, the collection of electronic records.

19. A non-transitory computer-readable storage medium storing one or more programs that are configured to be executed by one or more processors of a computer system, the one or more programs including instructions for:

assigning, to a first mode, a plurality of API protocols in a first API set, each of the plurality of API protocols corresponding to (i) one or more unique provider computing systems administering one or more services, and (ii) one or more functionality restrictions for each service;

assigning, to a second mode, a subset of the plurality of API protocols in a second API set comprising fewer API protocols than the first API set;

accepting a user credential via a first virtual interface, and granting access to a digital controls portal in response to authenticating the user credential;

presenting, via the digital controls portal, a dashboard comprising a second virtual interface with:

a first selectable visual element that corresponds to the first mode and that is configured to indicate a first selection to activate the first mode;

a second selectable visual element that corresponds to the second mode and that is configured to indicate a second selection to activate the second mode; and a third selectable visual element that corresponds to a third mode and that is configured to indicate a third selection to activate the third mode; and executing at least one of:

(A) all API protocols in the first API set in response to detecting the first selection via the second virtual interface of the dashboard;

(B) all API protocols in the second API set in response to detecting the second selection via the second virtual interface of the dashboard; or (C) API protocols in a third API set in response to detecting the third selection via the second virtual interface of the dashboard, the third API set having API protocols associated with financial accounts.

* * * * *